US012727024B2

(12) United States Patent
Yang et al.

(10) Patent No.: US 12,727,024 B2
(45) Date of Patent: Sep. 1, 2026

(54) TRANSMISSION CONTROL FOR MULTI-RELAY BASED COMMUNICATION

(71) Applicant: QUALCOMM Incorporated, San Diego, CA (US)

(72) Inventors: Luanxia Yang, Beijing (CN); Jing Sun, San Diego, CA (US); Changlong Xu, Beijing (CN); Xiaoxia Zhang, San Diego, CA (US); Rajat Prakash, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 18/285,491

(22) PCT Filed: May 27, 2021

(86) PCT No.: PCT/CN2021/096319
§ 371 (c)(1),
(2) Date: Oct. 3, 2023

(87) PCT Pub. No.: WO2022/246730
PCT Pub. Date: Dec. 1, 2022

(65) Prior Publication Data

US 2024/0188121 A1 Jun. 6, 2024

(51) Int. Cl.
*H04W 72/566* (2023.01)
*H04W 72/11* (2023.01)
(Continued)

(52) U.S. Cl.
CPC .......... *H04W 72/569* (2023.01); *H04W 72/11* (2023.01); *H04W 72/1273* (2013.01); *H04W 88/04* (2013.01)

(58) Field of Classification Search
CPC ............... H04W 72/569; H04W 72/11; H04W 72/1273; H04W 88/04; H04W 72/23; H04L 5/0064; H04L 5/0053
See application file for complete search history.

(56) References Cited

U.S. PATENT DOCUMENTS

2018/0199229 A1* 7/2018 Lee .................... H04W 72/569
2018/0255499 A1* 9/2018 Loehr .................. H04W 40/22
(Continued)

FOREIGN PATENT DOCUMENTS

WO 2019194574 A1 10/2019
WO 2020168223 A1 8/2020
WO 2020222291 A1 11/2020

OTHER PUBLICATIONS

International Search Report and Written Opinion—PCT/CN2021/096319—ISA/EPO—Nov. 30, 2021—14 pages.

*Primary Examiner* — Afshawn M Towfighi
(74) *Attorney, Agent, or Firm* — Procopio, Cory, Hargreaves & Savitch LLP

(57) ABSTRACT

A configuration for transmission control for multi-relay based communication. The apparatus determines a priority of data transmission at each relay of a plurality of relays between the base station and at least one UE. The apparatus transmits a PDSCH comprising control information for the at least one UE and a priority indication instructing each relay of the plurality of relays which data is contained in the PDSCH. The PDSCH may include an indication indicating whether data corresponding to the at least one UE is contained in the PDSCH. The PDSCH may include a field that identifies data and a corresponding UE of the at least one UE that is contained in the PDSCH. The apparatus may transmit, to each relay of the plurality of relays, the priority of data transmission, wherein the priority of data transmission includes a priority for uplink and downlink transmissions.

30 Claims, 16 Drawing Sheets

(51) Int. Cl.

| | |
|---|---|
| ***H04W 72/1273*** | (2023.01) |
| *H04W 88/04* | (2009.01) |

(56) References Cited

U.S. PATENT DOCUMENTS

| | | | | |
|---|---|---|---|---|
| 2021/0028891 | A1* | 1/2021 | Zhou | H04W 4/40 |
| 2022/0022210 | A1* | 1/2022 | Park | H04W 72/566 |
| 2022/0039029 | A1* | 2/2022 | Zhang | H04W 52/146 |
| 2023/0073469 | A1* | 3/2023 | Wang | H04W 40/22 |
| 2023/0188301 | A1* | 6/2023 | Ma | H04L 1/1854 |

* cited by examiner

Source Device

Network

Target Device

402

Start of transmission time

406

Down Up

Communication Service

As experienced by application

Correctly Received Messages

Incorrectly Received Messages

Up Time Interval

Down time interval

404

Survival time

Operational Interval

Up Time Interval

Down time interval

Failure

Deadline for Message Reception

TRANSMISSION CONTROL FOR MULTI-RELAY BASED COMMUNICATION

CROSS REFERENCE TO RELATED APPLICATION(S)

This application is a National Stage Application filed under 35 U.S.C. § 371 of PCT International Application No. PCT/CN2021/096319, entitled "TRANSMISSION CONTROL FOR MULTI-RELAY BASED COMMUNICATION" and filed May 27, 2021, which is expressly incorporated by reference herein in its entirety.

TECHNICAL FIELD

The present disclosure relates generally to communication systems, and more particularly, to a configuration for transmission control for multi-relay based communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus determines a data priority for transmission to at least one user equipment (UE). At least one relay is between the base station and the at least one UE. The apparatus transmits a physical downlink shared channel (PDSCH) comprising control information for the at least one UE and a priority indication comprising the data priority for transmission to the at least one UE, wherein data transmitted by the at least one relay to the at least one UE is based on the priority indication.

In an aspect of the disclosure, a method, a computer-readable medium, and an apparatus are provided. The apparatus may be a device at a UE. The device may be a processor and/or a modem at a UE or the UE itself. The apparatus determines an uplink data priority for transmission to a base station. At least one relay is between the UE and the base station. The apparatus transmits a priority indication comprising the uplink data priority for transmission to the base station, wherein data transmitted by the at least one relay to the base station is based on the priority indication.

In an aspect of the disclosure, a method, a computer-readable medium, and an apparatus are provided. The apparatus may be a device at a relay. The device may be a processor and/or a modem at a relay or the relay itself. The apparatus receives, from a base station or a user equipment (UE), a priority indication comprising a data priority for transmission to the base station or the UE. The apparatus relays a received signal to the base station or the UE based on the priority indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
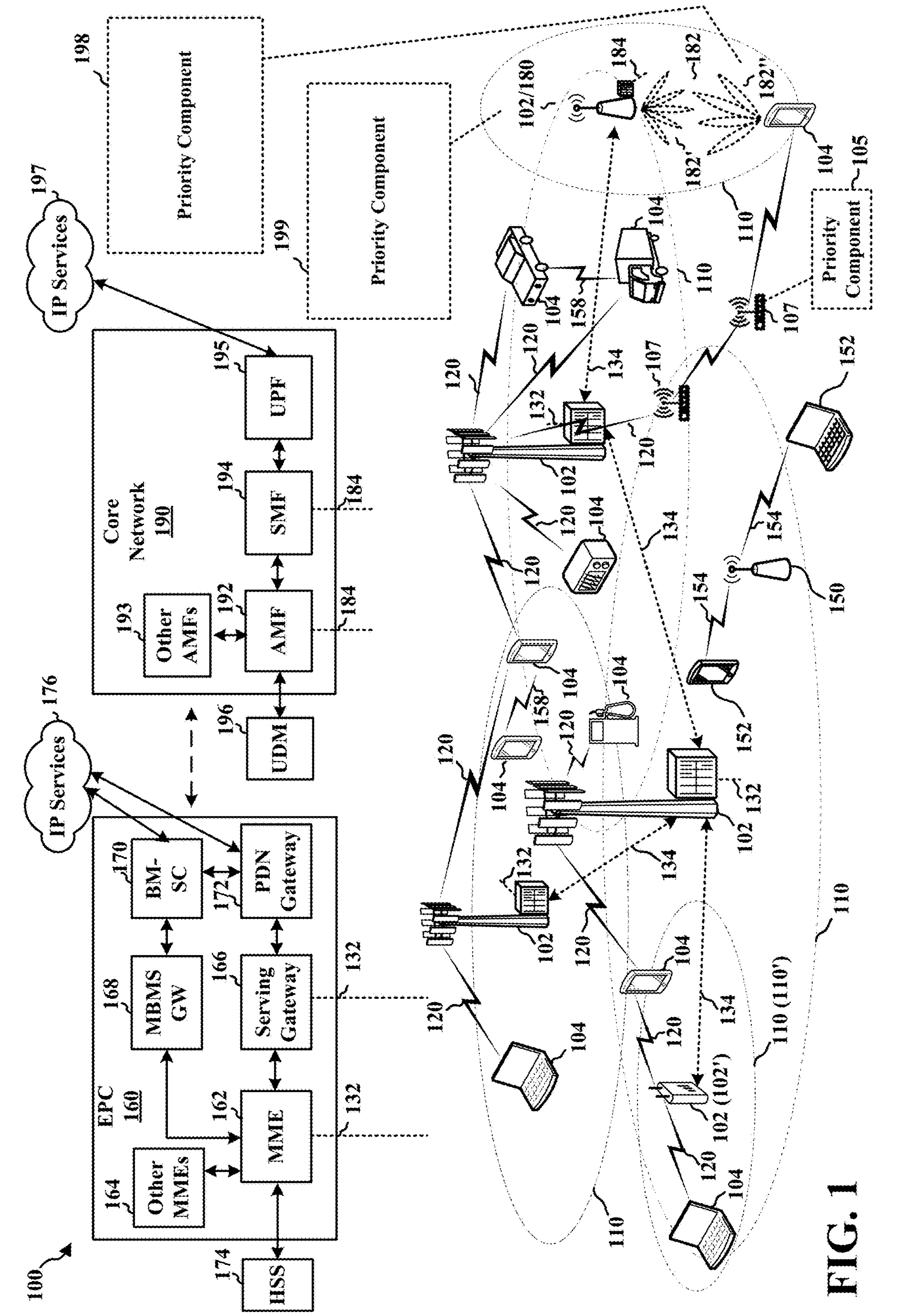
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE

104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to provide a priority of uplink transmissions to each relay node of a plurality of relay nodes between the UE and a base station. For example, the UE 104 may comprise a priority component 198 configured to provide a priority of uplink transmissions to each relay node of a plurality of relay nodes between the UE and a base station. The UE 104 may determine an uplink data priority for transmission to a base station. At least one relay is between the UE and the base station. The UE 104 may transmit a priority indication comprising the uplink data priority for transmission to the base station. Data transmitted by the at least one relay to the base station is based on the priority indication.

Referring again to FIG. 1, in certain aspects, the relay 107 may be configured to relay received signals based on a priority indication. For example, the relay 107 may comprise a priority component 105 that may be configured to relay received signals based on a priority indication. The relay 107 may receive, from a base station 180 or a UE 104, a priority indication comprising a data priority for transmission to the base station or the UE. The relay 107 may relay a received signal to the base station or the UE based on the priority indication.

Referring again to FIG. 1, in certain aspects, the base station 180 may be configured to provide a priority of data to be transmitted at each relay node. For example, the base station 180 may comprise a priority component 199 configured to provide a priority of data to be transmitted at each relay node. The base station 180 may determine a data priority for transmission to at least one UE. At least one relay is between the base station and the at least one UE. The base station 180 may transmit a PDSCH comprising control information for the at least one UE and a priority indication comprising the data priority for transmission to the at least one UE, wherein data transmitted by the at least one relay to the at least one UE is based on the priority indication.

Although the following description may be focused on 5G NR, the concepts described herein may be applicable to other similar areas, such as LTE, LTE-A, CDMA, GSM, and other wireless technologies.

Figure 2B:
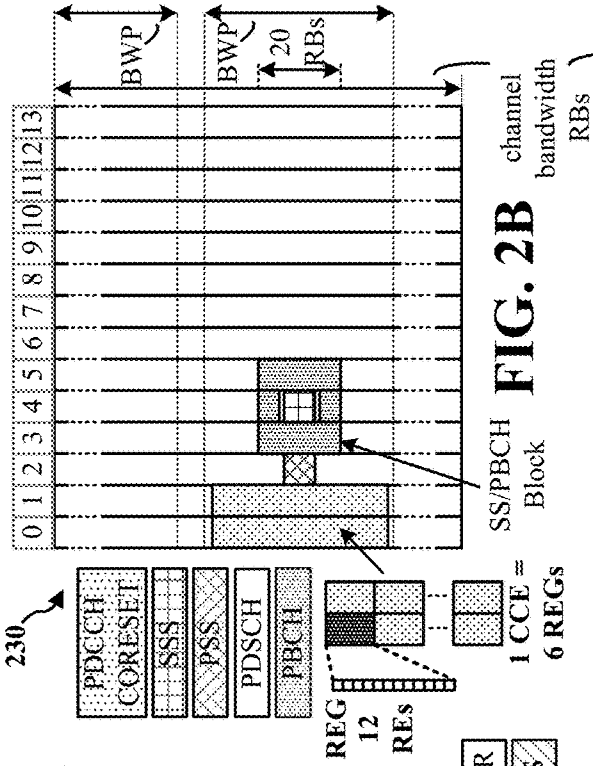
FIG. 2B is a diagram illustrating an example of DL channels within a subframe, in accordance with various aspects of the present disclosure.
Figure 2A:
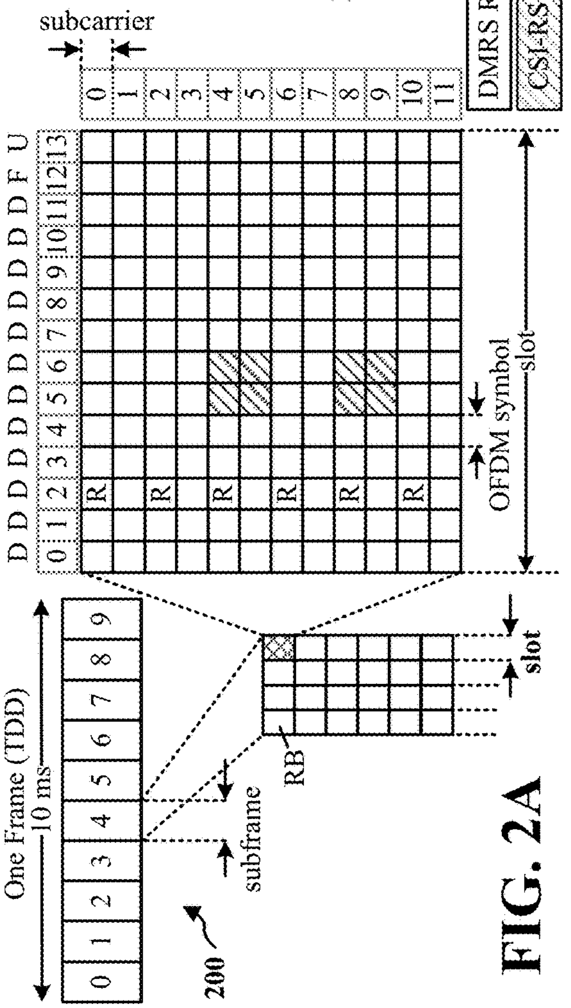
FIG. 2A is a diagram illustrating an example of a first frame, in accordance with various aspects of the present disclosure.
Figure 2D:
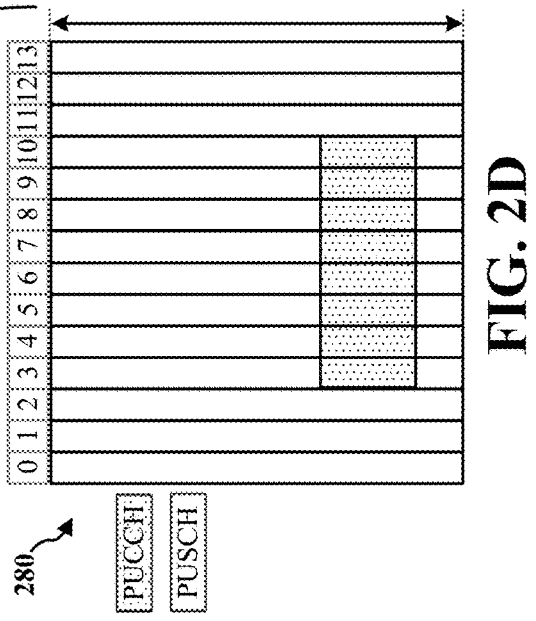
FIG. 2D is a diagram illustrating an example of UL channels within a subframe, in accordance with various aspects of the present disclosure.
Figure 2C:
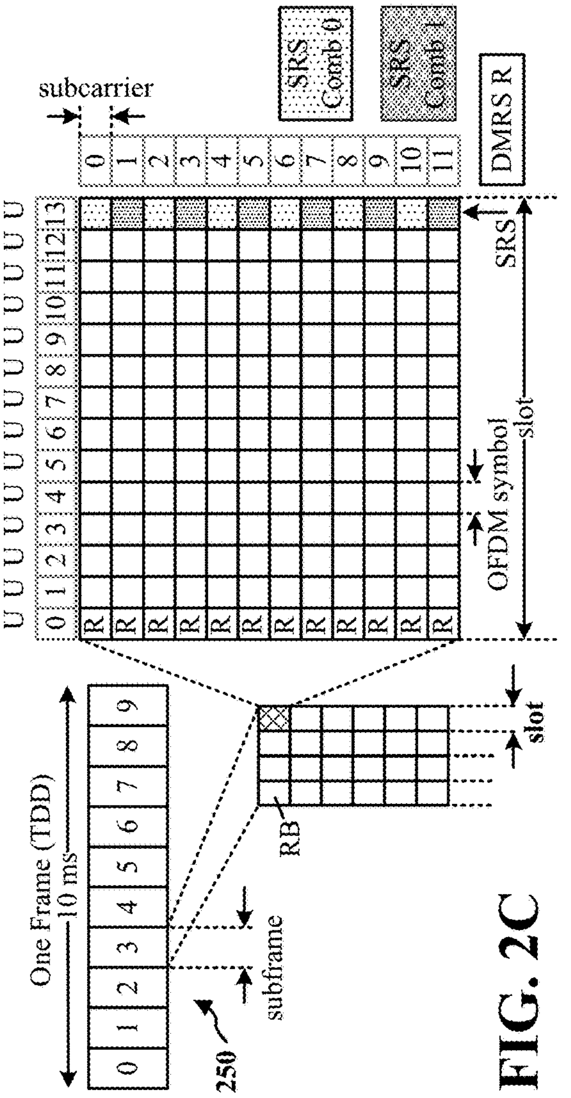
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. The subcarrier spacing may be equal to $2^{\mu}*15$ kHz, where y is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
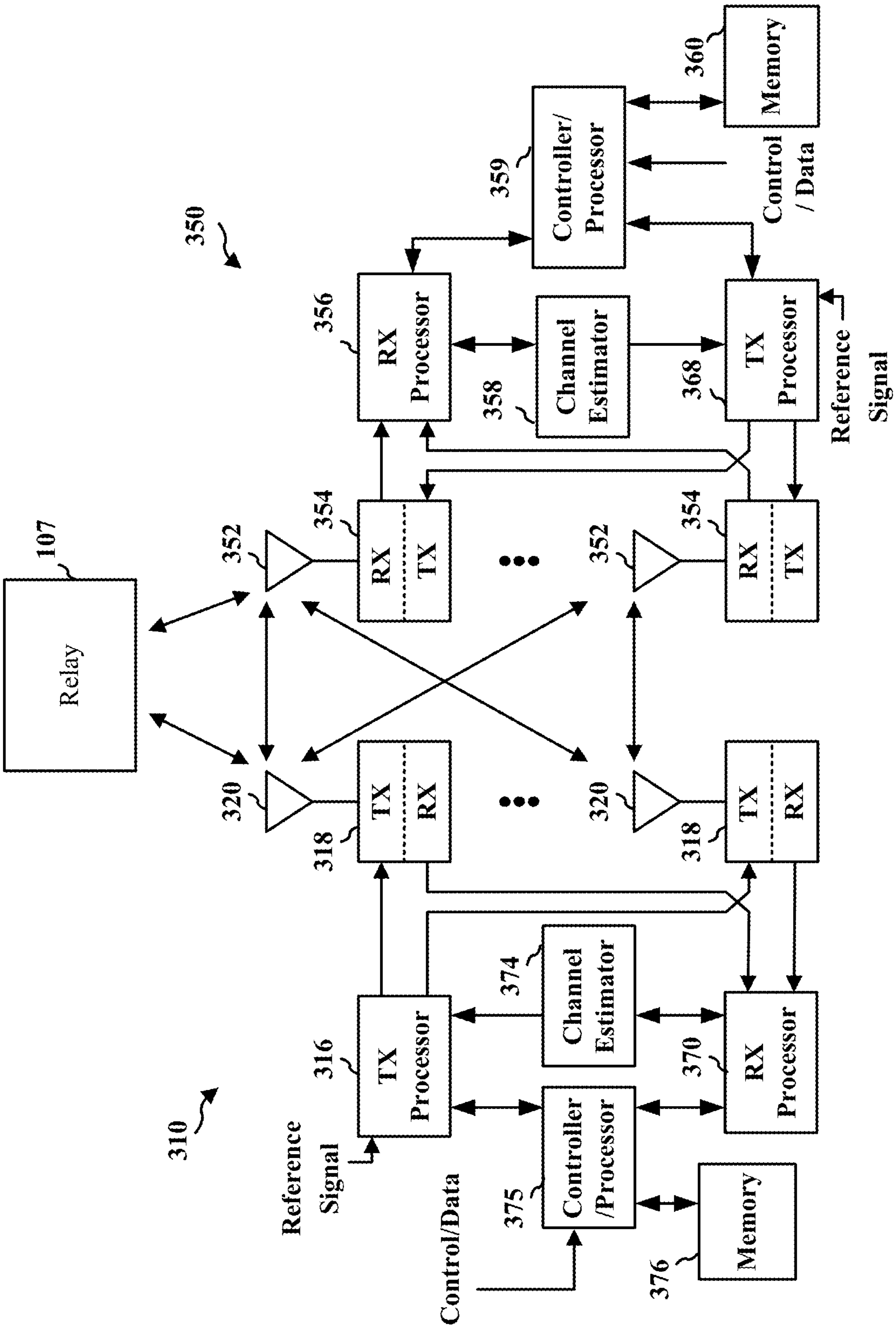
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
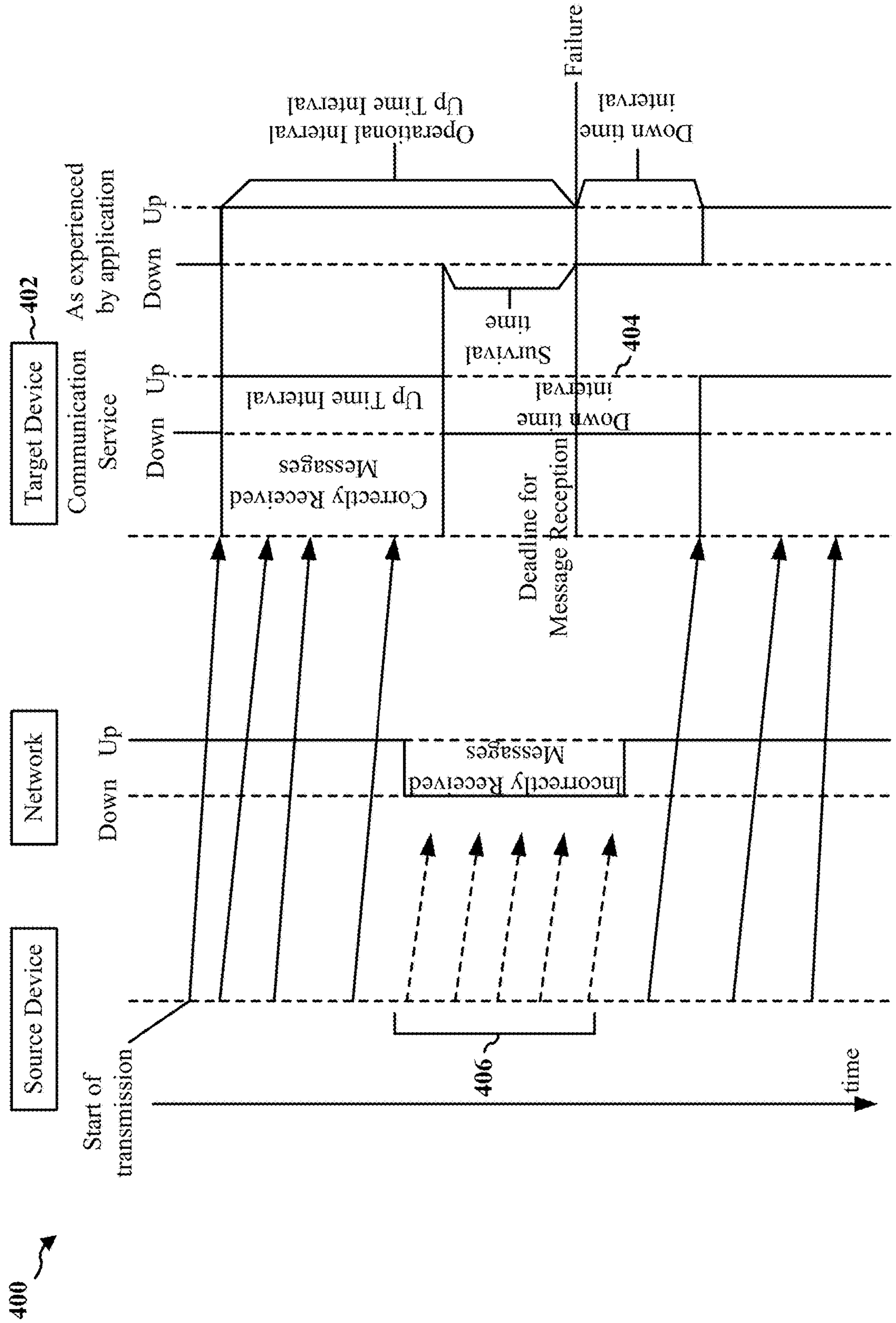
FIG. 4 is a diagram illustrating an example of survival time.
Figure 5:
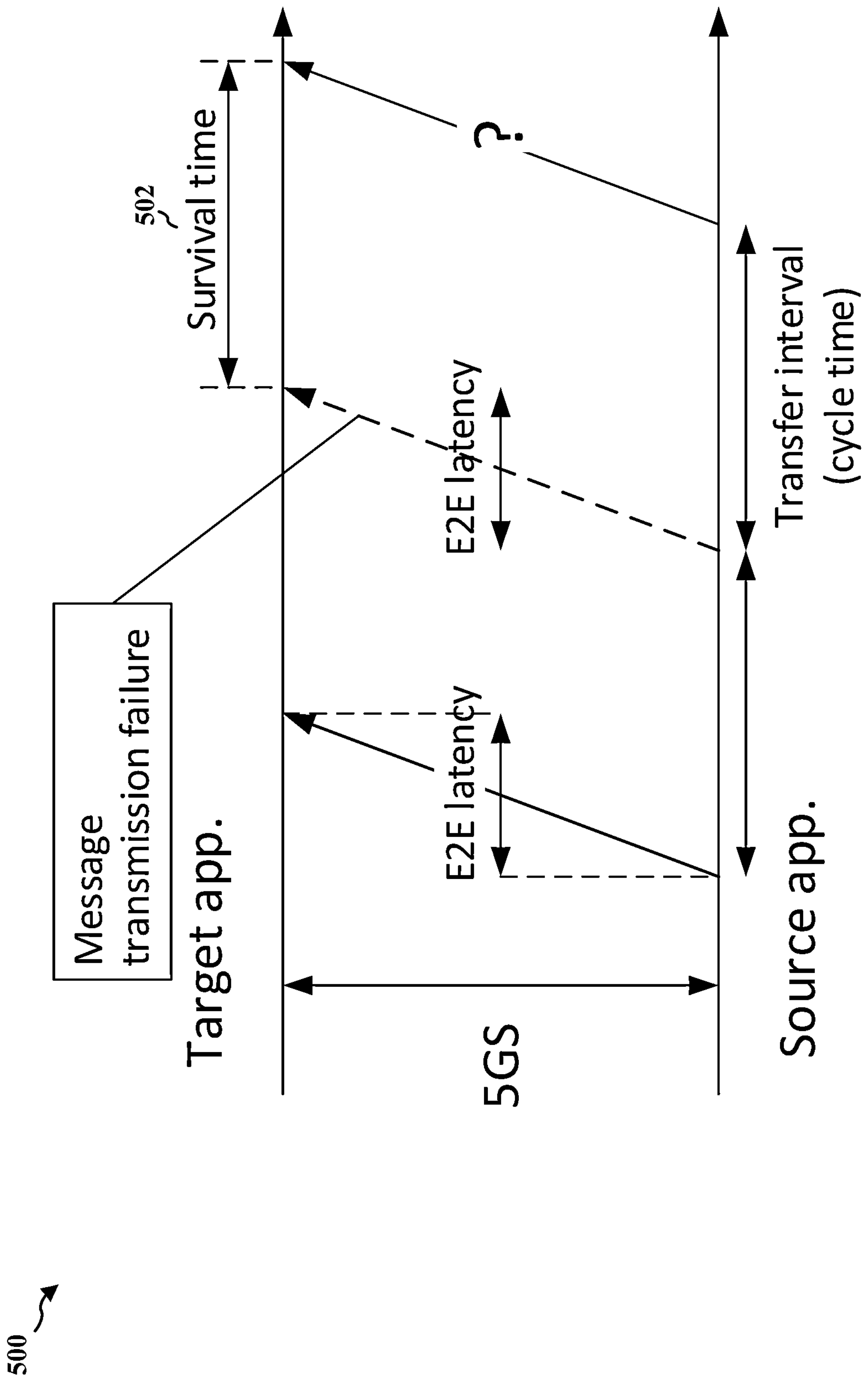
FIG. 5 is a diagram illustrating an example of survival time.

In wireless communication systems, a survival time may be expressed as a period of time or, especially with cyclic traffic, as a maximum number of consecutive incorrectly received or lost messages. If the survival time has been exceeded, the application may transition the status of the communication service into a down state. For example, with reference to the example 400 of FIG. 4, if transmissions 406 are incorrectly received or are lost, the communication at the target device 402 is switched to a down time interval 404. In some instances, for example with reference to the example 500 of FIG. 5, the survival time 502 may be related to a transfer interval.

Figure 6:
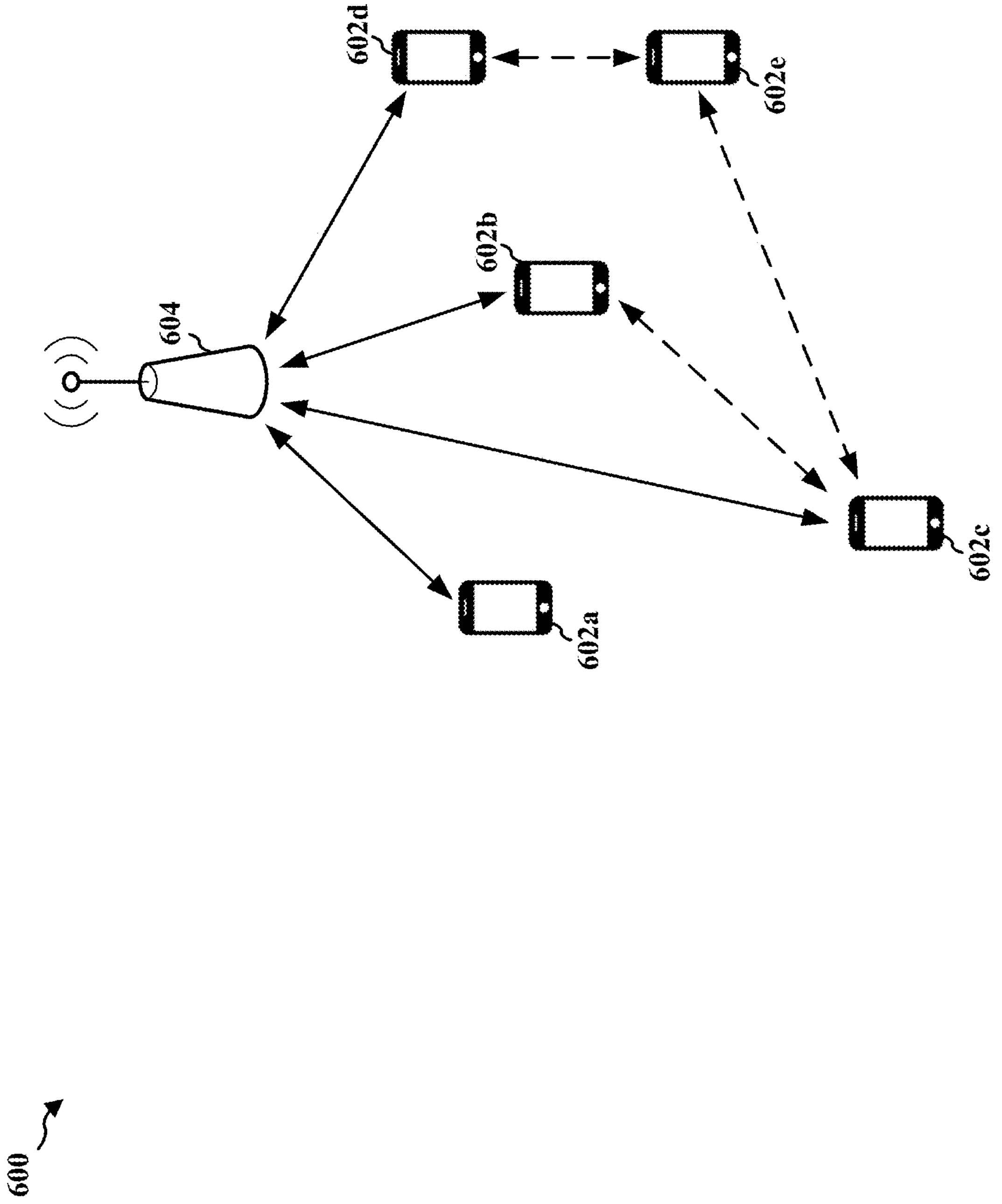
FIG. 6 is a diagram illustrating an example of a base station and UEs in a wireless communication system.

Wireless communication between a base station 604 and UEs (e.g., 602*a-e*) may include a direct link between the base station 604 and the UE (e.g., 602*a*, 602*b*, 602*c*, 602*d*). Sidelink communication may comprise direct communication between UEs. With reference to example 600 of FIG. 6, UEs 602*b* and 602*c* may have established a sidelink connection to communicate with each other. In addition, UEs 602*d* and 602*e*, and 602*c* and 602*e* may also have sidelink connections to communicate with each other. As an enhancement, sidelink communication may allow for using a UE as a relay device to assist a UE (e.g., UE 602*c*) to communicate with the base station in instances where the UE (e.g., 602*c*) has limited coverage or is experiencing difficulty in communicating with the base station. The relay UE (e.g., 602*b*) may be in a better position to communicate with the base station, than the UE 602*c*, such that the UE 602*c* may communicate with the base station via the UE 602*b*.

Figure 7:
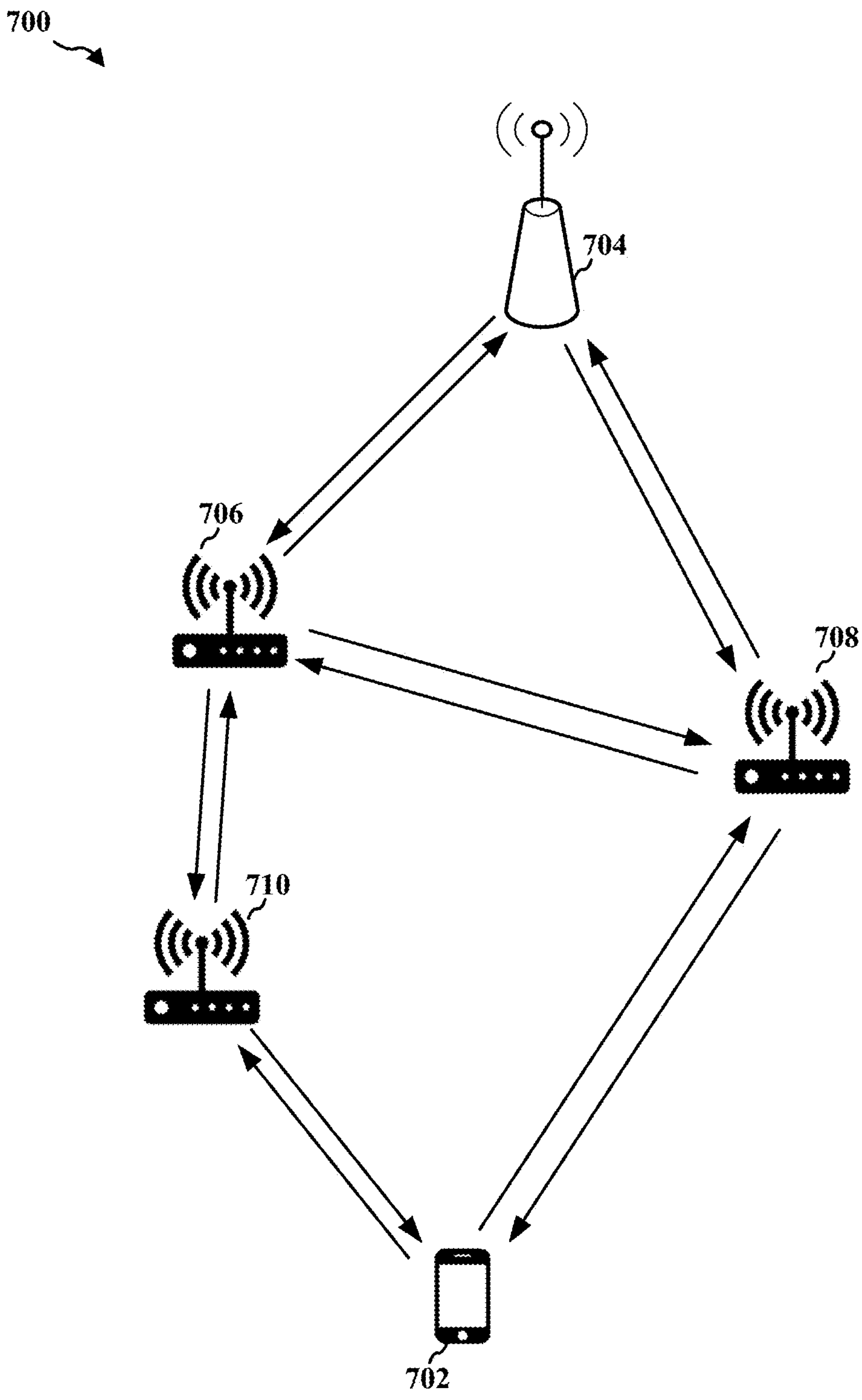
FIG. 7 is a diagram illustrating an example of a multi-relay based communication system.

FIG. 7 provides an example 700 of a multi-relay based communication system. The example 700 of FIG. 7 may comprise a UE 702, a base station 704, and one or more relay devices 706, 708, 710. The UE 702 may communicate with the base station 704 using the one or more relay devices. In some instances, there may be multiple relay links between the UE 702 and the base station 704. For example, in instances where only one relay (e.g., 708) is between the UE 702 and the base station 704, two relay links are present between the UE 702 and the base station 704. A first relay link comprising a link between the UE 702 and the relay 708, and a second relay link comprising a link between the relay 708 and the base station 704. In some instances, three or more relay links may be present between the UE 702 and the base station 704. For example, a first relay link may comprise a link between the UE 702 and the relay 710, a second relay link may comprise a link between the relay 710 and the relay 706, and a third relay link may comprise a link between the relay 706 and the base station 704. The process of signal relay utilizes the physical layer, and does not involve the upper layer or the MAC layer, such that delay may be minimal. In multi-relay communications, the base station controls the transmission and retransmission of each relay and the content to be transmitted. As a result, the base station may be updated with the status of the decoding at each relay. For example, if a transport block is decoded at a relay, the transport block may be forwarded down-stream or up-stream. If a transport block is not properly decoded at a relay node, the base station may schedule a retransmission of the transport block to the relay. The use of relay devices may be used to increase the coverage of the base station as well as reduce the load of the base station. The base station may schedule the relay transmission and reception in downlink and uplink. However, a problem exists with regards to the prioritization of data to be transmitted at each node, especially in instances where multiple transport blocks are piling up at a relay node before it can be forwarded.

Aspects provided herein provide a configuration for transmission control for multi-relay based communication. For example, a base station may be configured to provide a priority of data to be transmitted at each relay node. The base station may determine the data to be transmitted for each scheduled resource.

Figure 9:
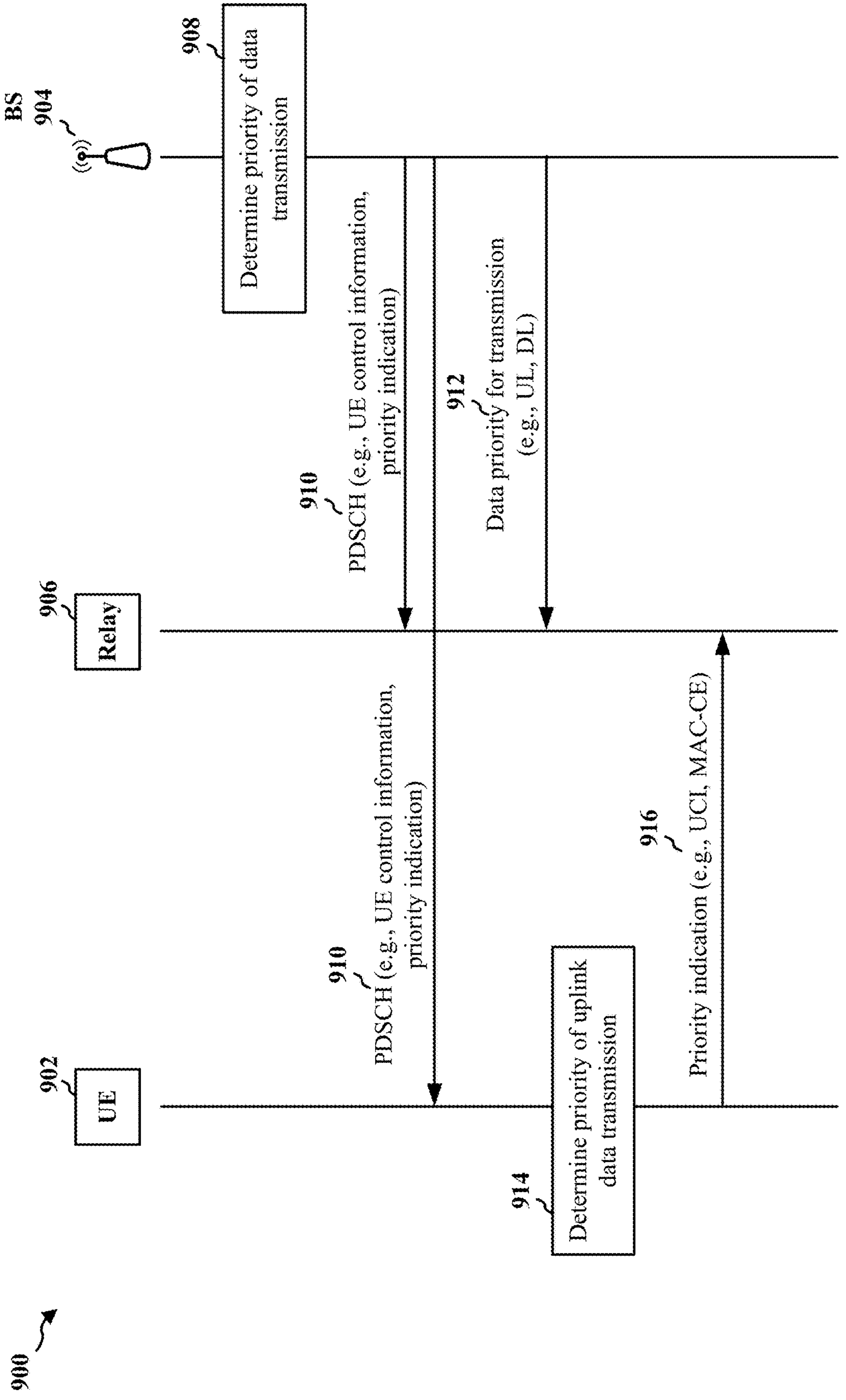
FIG. 9 is a call flow diagram of signaling between a relay device and a base station.

FIG. 9 is a call flow diagram 900 of signaling between a UE 902 and a base station 904. The base station 904 may be configured to provide at least one cell. The UE 902 may be configured to communicate with the base station 904. For example, in the context of FIG. 1, the base station 904 may correspond to base station 102/180 and, accordingly, the cell may include a geographic coverage area 110 in which communication coverage is provided and/or small cell 102' having a coverage area 110'. Further, a UE 902 may correspond to at least UE 104. In another example, in the context of FIG. 3, the base station 904 may correspond to base station 310 and the UE 902 may correspond to UE 350.

As illustrated at 908, the base station 904 may the determine a data priority for transmission. The base station may determine the data priority for transmission to at least one UE. At least one relay (e.g., 906) may be between the base station 904 and the at least one UE 902. The data priority may indicate which data may be carried in a scheduled resource. The base station 908 may control the transmission and/or retransmission of each relay. The base station 908 may be aware of the status of the data at each node, such that the base station may know the quality of service of the data. As such, the base station may indicate which data is to be carried on the scheduled resource. For example, if the scheduled resource for a relay is smaller than the data to be relayed by the relay, the base station may prioritize the data to be transmitted at the relay to avoid or minimize data piling up at the relay before it can be forwarded.

Figure 8A:
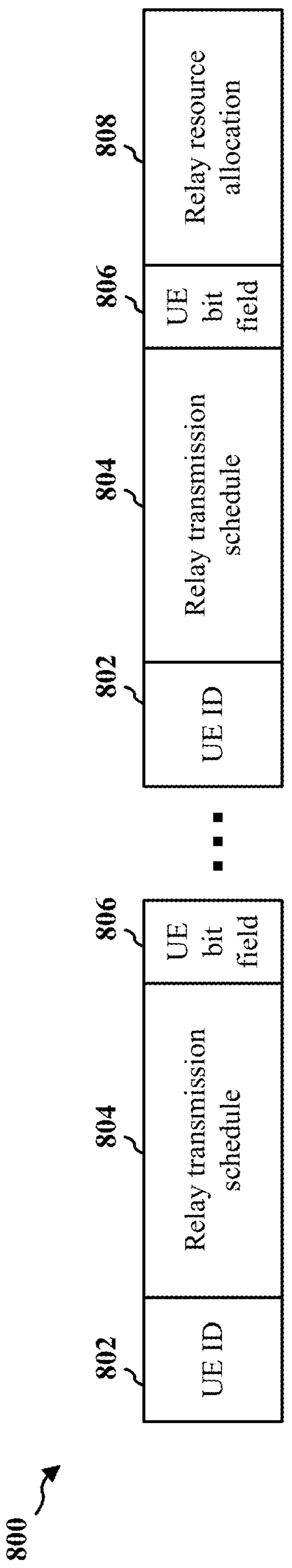
FIG. 8A is a diagram illustrating an example of a signal in a multi-relay based communication.
Figure 8B:
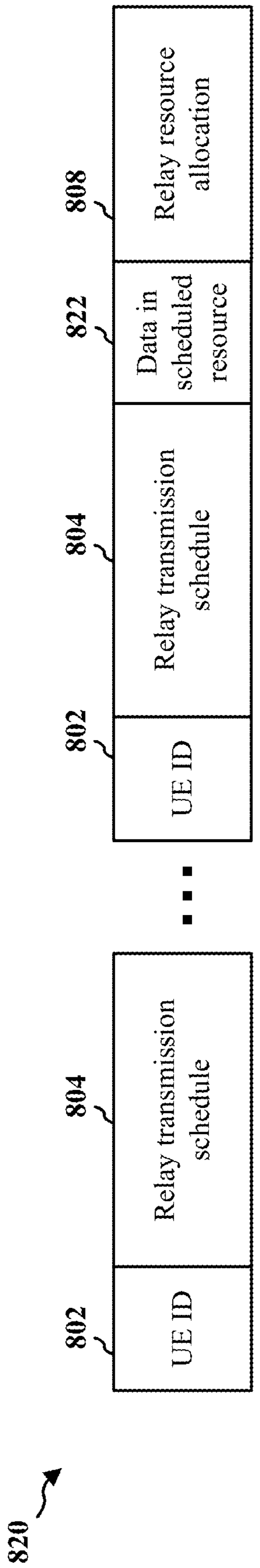
FIG. 8B is a diagram illustrating an example of a signal in a multi-relay based communication.

As illustrated at 910, the base station 904 may transmit a physical downlink shared channel (PDSCH) comprising control information and a priority indication. The PDSCH may comprise the control information for the at least one UE. In some aspects, the PDSCH may comprise control information for a plurality of UEs. The PDSCH may comprise the priority indication comprising the data priority for transmission to the at least one UE. Data transmitted by the at least one relay to the at least one UE may be based on the priority indication. The base station may transmit the PDSCH to the at least one UE and to each relay of the plurality of relays 906. The relay 906 may receive the PDSCH comprising the control information and the priority indication. In some aspects, the PDSCH may be relayed to at least a first relay, which may relay the PDSCH to at least one child relay until each relay within a relay path has received the PDSCH. In some aspects, the priority indication indicates the data corresponding to the at least one UE to be included in the transmission from the at least one relay to the at least one UE. The priority indication may comprise a bit for each of the at least one UE. For example, with reference to diagram 800 of FIG. 8A, the PDSCH may comprise a UE identifier (ID) 802, a relay transmission schedule 804, a UE bit field 806, and a relay resource allocation 808. The PDSCH may comprise the UE ID 802, relay transmission schedule 804, and UE bit field 806 for each UE. For example, the UE ID 802 may indicate which UE is to receive the PDSCH. The relay transmission schedule 804 may indicate the timing as to when a relay may relay the PDSCH, while the relay resource allocation 808 may provide the available resources for the relay to relay the PDSCH. The UE bit field 806 may be configured to indicate whether data for a UE is carried in the scheduled resource. In some aspects, the priority indication may comprise a plurality of bits. For example, in instances where there is one UE with more than one transport block, the base station may use more than one bit in the UE bit field 806 to indicate which transport block of the UE may be carried in the scheduled resource. The plurality of bits may identify a transport block of a plurality of transport blocks of the at least one UE may be included in the PDSCH transmitted to the at least one UE from the at least one relay. In some aspects, the priority indication may include a field that identifies data and a corresponding UE of the at least one UE that is to be relayed by the at least one relay. The field may identify the corresponding UE based on a UE identifier. The field may identify the data based on a transport block indication. For example, with reference to diagram 820 of FIG. 8B, the PDSCH may comprise a data in scheduled resource field 822 which may indicate which UE and the corresponding data of such UE that may be carried in the scheduled resource. The UE ID or a compressed form of UE ID and a transport block indication may be included in the data in scheduled resource field 822. In some aspects, RRC signaling may configure the mapping from ID in PDCCH to UE ID.

As illustrated at 912, the base station may transmit, to each relay of the plurality of relays, the data priority for transmission to at least one UE 902. The data priority may include a traffic priority indicating a priority for uplink and downlink transmissions. The traffic priority may include the priority for uplink and downlink transmissions for each UE. The base station may schedule resources for the relay device to relay data transmissions. In some aspects, the relay may determine which data will be transmitted based at least on the priority information of the transport blocks. In some aspects, the traffic priority may indicate that downlink transmission has priority if a dynamic grant PDSCH is between a parent node and a relay of the plurality of relays and also between the relay and a child node. The traffic priority may be indicated in a PDCCH. In some aspects, for example, for down-stream forwarding, there may be a downlink grant and a PDSCH for the relay to receive the downlink data from the parent, and there may be a forwarded downlink grant and forwarded PDSCH allocation for the relay to forward the downlink data to a child relay node. For downlink data reception, the traffic priority may be provided in the downlink grant, and the traffic priority may be used when data is forwarded in the down-stream when a down-stream transmission is granted. In some aspects, such as for a downlink outgoing grant, another priority may be provided to further determine the priority of the data to be included or prioritized.

In some aspects, the traffic priority may indicate that downlink transmission has priority if a semi-persistent scheduling (SPS) PDSCH (SPS-PDSCH) is between a parent node and a relay of the plurality of relays. The traffic priority may be indicated in a PDCCH that activates the SPS-PDSCH. For example, for down-stream forwarding, there may be an SPS-PDSCH for the relay to receive the downlink data from the parent, and there may be a forwarded downlink grant and forwarded PDSCH allocation for the relay to forward the downlink data to a child relay node. In some aspects, such as for a downlink outgoing grant, another priority may be provided to further determine the priority of the data to be included or prioritized. In some aspects, for example downlink data reception, the traffic priority may be provided in a PDCCH which may be used to activate the SPS-PDSCH or provided in RRC configuration.

In some aspects, the traffic priority may indicate that downlink transmission has priority if an SPS-PDSCH is between a relay of the plurality of relays and a child node. The traffic priority may be indicated in a PDCCH that activates the SPS-PDSCH. In some aspects, for example for down-stream forwarding, there may be a downlink grant and a PDSCH for the relay to receive the downlink data from the parent, and there may be an SPS-PDSCH for the relay to forward the downlink data to a child node. In some aspects, for example for downlink data reception, the traffic priority may be provided in the downlink grant, and the priority may be used when data is forwarded in the down-stream when a down-stream transmission is granted. In some aspects, such as for down-stream forwarding, there may be a downlink grant and a PDSCH for the relay to receive the downlink data from a parent, and there may be an SPS-PDSCH for the relay to forward the downlink data to a child node. For downlink data reception, the traffic priority may be provided in the downlink grant, and the priority may be used when data is forwarded in the down-stream when a down-stream transmission is granted. For downlink outgoing grant, the traffic priority which is used to further determine which priority of data to be included or prioritized may be included in the PDCCH used to activate the SPS-PDSCH. In some aspects, the priority which is used to further decide which priority of data to be included or prioritized may be included in the RRC configuration.

In some aspects, the traffic priority may indicate that uplink transmission has priority if a dynamic grant physical uplink shared channel (PUSCH) is between a parent node and a relay of the plurality of relays and between the relay and a child node, wherein the traffic priority is indicated in a PDCCH. For uplink data reception, there may be an uplink grant and a PDSCH for the relay to receive the uplink data from a child relay node and there may be a forwarding PUSCH allocation for the relay to forward the uplink data to a parent node. For uplink data reception, the priority may be provided in an uplink grant, and the priority may be used when data is forwarded to in the up-stream when an up-stream transmission is granted. For uplink data forwarding to a parent, another priority may be provided to further determine which priority of the data to be included or prioritized.

In some aspects, the traffic priority may indicate that uplink transmission has priority if a configured grant physical uplink shared channel (CG-PUSCH) is between a parent node and a relay of the plurality of relays. The traffic priority may be indicated in a PDCCH that activates the CG-PUSCH. For uplink data reception, there may be an uplink grant and a PDSCH for the relay to receive the uplink data from a child node, and there may be a CG-PUSCH for the relay to forward the uplink data to a parent node. For uplink data forwarding to a parent, the priority which may be used to further determine which priority of the data to be include or prioritized may be included in the PDCCH used to activate the CG-PUSCH. In some aspects, for uplink data forwarding to the parent, the priority which may be used to further determine which priority of data to be included or prioritize may be included in RRC configuration. For uplink data reception, there may be an uplink grant and a PDSCH for the relay to receive the uplink data from a child relay node and there may be a forwarding PUSCH allocation for the relay to forward the uplink data to a parent node.

In some aspects, the traffic priority may indicate that uplink transmission has priority if a CG-PUSCH is between a relay of the plurality of relays and a child node. The traffic priority may be indicated in a PDCCH that activates the CG-PUSCH. For example, for uplink data reception, there may be an uplink grant and a PDSCH for the relay to receive the uplink data from a child node, and there may be a forwarding PUSCH allocation for the relay to forward the uplink data to a parent node. For uplink data forwarding to a parent, another priority may be provided to further determine which priority of the data to be included or prioritized. For uplink reception, the priority may be provided in a PDCCH which may be used to activate the CG-PUSCH or may be provided in RRC configuration.

In some aspects, the base station may indicate the priority of downlink data, while the UE may indicate the priority of uplink data. For example, as illustrated at 914, the UE 902 may determine an uplink data priority for transmission to a base station. The uplink data priority may indicate which data may be carried in a scheduled resource. In some aspects, the base station 904 may not be aware of that the uplink data may be within the survival time. If the data is within the survival time requirement, the base station or the UE may indicate the priority of the data for each transmission during the survival time in order for the feedback to go through a different route. For example, the priority of the data may be increased across the survival time, if the feedback goes through the same relay, such that the relay may be aware that the priority will increase during the survival time. For downlink priority, the base station may indicate the priority of data to be carried in the scheduled resource, as discussed above for 910.

For uplink priority, as illustrated at 916, the UE 902 may transmit a priority indication comprising the uplink data priority for transmission to the base station. The UE may transmit the priority indication to indicate the priority of data transmissions to at least one relay between the UE and the base station. Data transmitted by the at least one relay to the base station may be based on the priority indication. In some aspects, the priority indication may comprise a configured grant uplink control information (CG-UCI) if there is a single UE with a single transport block. The CG-UCI may comprise a priority field to indicate the priority of the uplink data transmission. In some aspects, the priority indication may be comprised in a group uplink control information (UCI) if there are multiple transport blocks per UE or multiple UEs in a physical uplink shared channel (PUSCH). The group UCI may comprise a priority field to indicate the priority of the uplink data transmission. In some aspects, an additional field may be added to the group UCI, for each UE, to indicate the priority of the PUSCH of the UE. In some aspects, the priority indication comprises a physical header or a medium access control (MAC) control element (CE) (MAC-CE) to indicate the priority of the uplink data transmission. The uplink data transmission may comprise an aggregated PUSCH. The physical header or the MAC-CE may indicate the priority of each PUSCH in the aggregated PUSCH.

Figure 10:
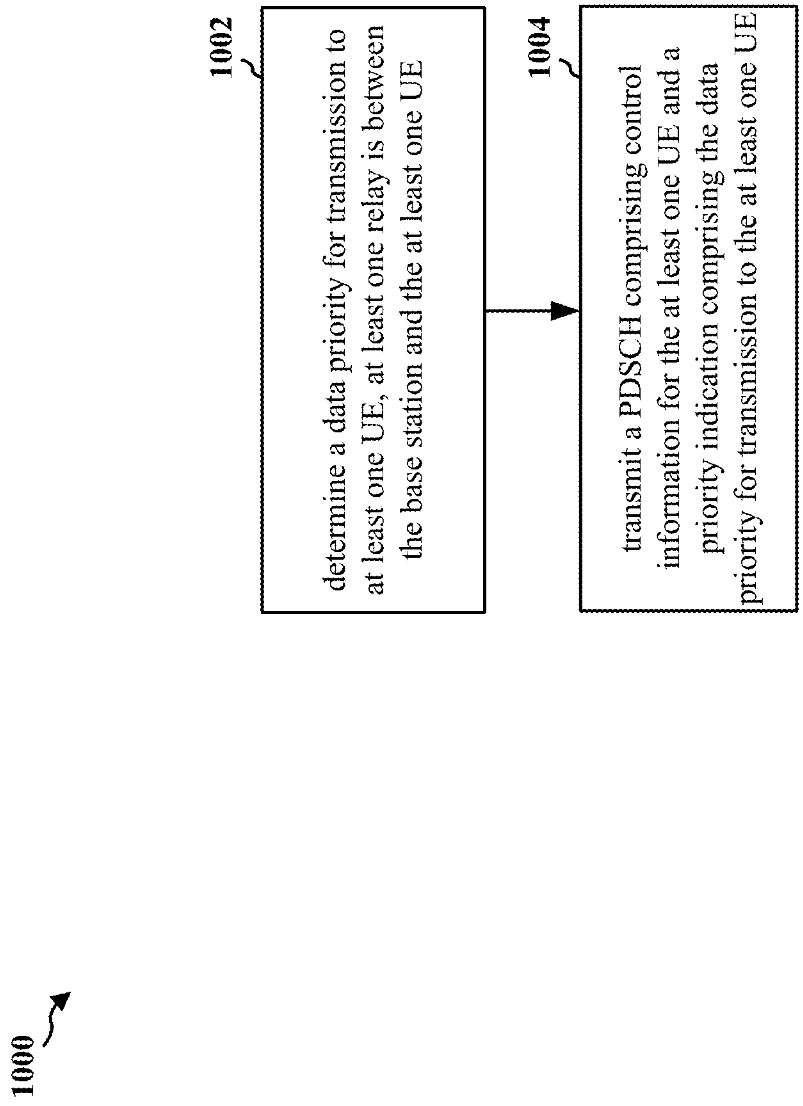
FIG. 10 is a flowchart of a method of wireless communication.

FIG. 10 is a flowchart 1000 of a method of wireless communication. The method may be performed by a base station or a component of a base station (e.g., the base station 102/180; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a base station to provide a priority of data to be transmitted at each relay node.

At 1002, the base station may determine a data priority for transmission. For example, 1002 may be performed by priority component 1240 of apparatus 1202. The base station may determine the data priority for transmission to at least one UE. At least one relay is between the base station and the at least one UE. The data priority may indicate which data may be carried in a scheduled resource. In the context of FIG. 9, the base station 904, at 908, may determine a data priority for transmission.

At 1004, the base station may transmit a PDSCH comprising control information and a priority indication. For example, 1004 may be performed by PDSCH component 1242 of apparatus 1202. The PDSCH may comprise the control information for the at least one UE. The PDSCH may comprise the priority indication comprising the data priority for transmission to the at least one UE. Data transmitted by the at least one relay to the at least one UE may be based on the priority indication. The base station may transmit the PDSCH to the at least one UE and to each relay of the plurality of relays. In some aspects, the PDSCH may be relayed to at least a first relay, which may relay the PDSCH to at least one child relay until each relay within a relay path has received the PDSCH. In some aspects, the priority indication indicates the data corresponding to the at least one UE to be included in the transmission from the at least one relay to the at least one UE. The priority indication may comprise a bit for each of the at least one UE. In some aspects, the priority indication may comprise a plurality of bits. The plurality of bits may identify a transport block of a plurality of transport blocks of the at least one UE to be included in a PDSCH transmitted to the at least one UE from the at least one relay. In some aspects, the priority indication may include a field that identifies data and a corresponding UE of the at least one UE that is to be relayed by the at least one relay. The field may identify the corresponding UE based on a UE identifier. The field may identify the data based on a transport block indication. In the context of FIG. 9, the base station 904 may transmit a PDSCH 910 comprising control information and a priority indication.

Figure 11:
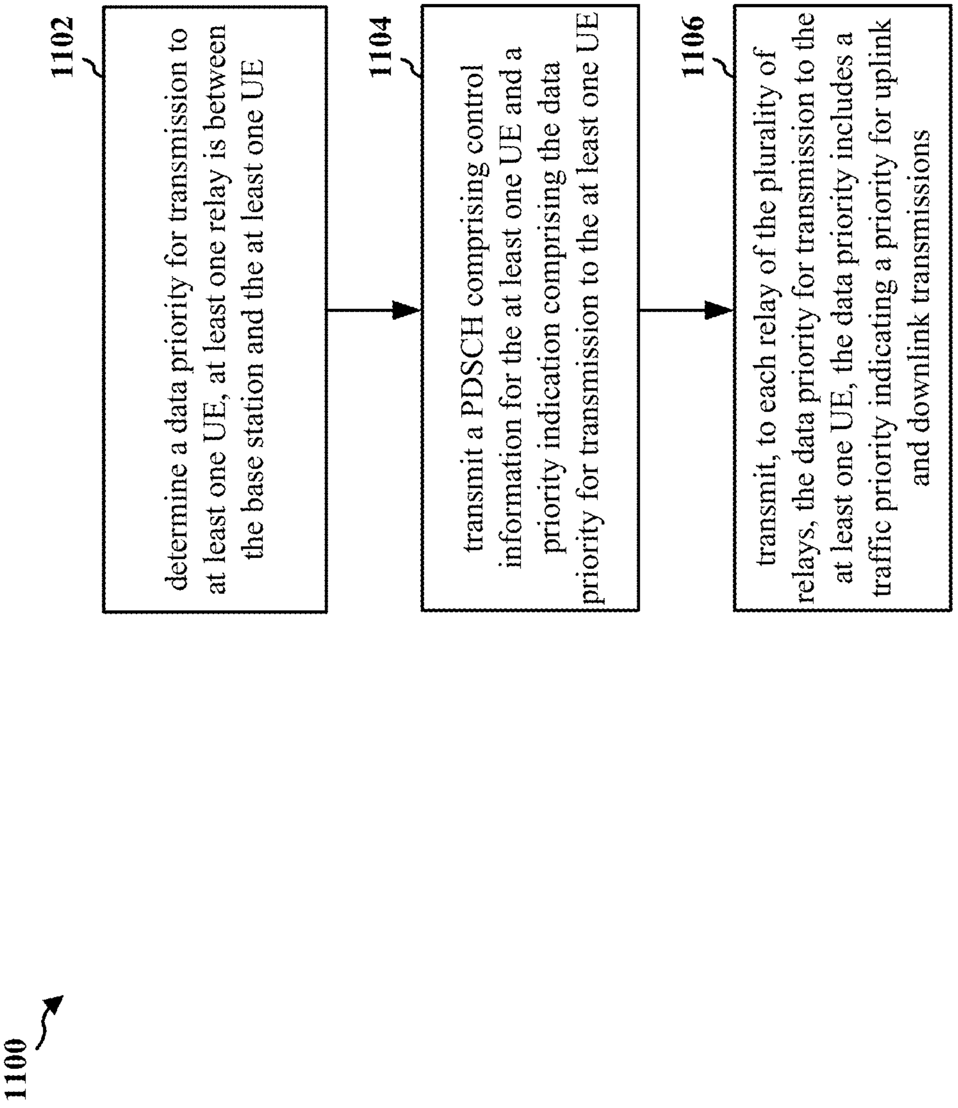
FIG. 11 is a flowchart of a method of wireless communication.

FIG. 11 is a flowchart 1100 of a method of wireless communication. The method may be performed by a base station or a component of a base station (e.g., the base station 102/180; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a base station to provide a priority of data to be transmitted at each relay node of a plurality of relay nodes between the base station and a UE.

At 1102, the base station may determine a data priority for transmission. For example, 1102 may be performed by priority component 1240 of apparatus 1202. The base station may determine the data priority for transmission to at least one UE. At least one relay is between the base station and the at least one UE. The data priority may indicate which data may be carried in a scheduled resource. In the context of FIG. 9, the base station 904, at 908, may determine a data priority for transmission.

At 1104, the base station may transmit a PDSCH comprising control information and a priority indication. For example, 1204 may be performed by PDSCH component 1242 of apparatus 1202. The PDSCH may comprise the control information for the at least one UE. The PDSCH may comprise the priority indication comprising the data priority for transmission to the at least one UE. Data transmitted by the at least one relay to the at least one UE may be based on the priority indication. The base station may transmit the PDSCH to the at least one UE and to each relay of the plurality of relays. In some aspects, the PDSCH may be relayed to at least a first relay, which may relay the PDSCH to at least one child relay until each relay within a relay path has received the PDSCH. In some aspects, the priority indication indicates the data corresponding to the at least one UE to be included in the transmission from the at least one relay to the at least one UE. The priority indication may comprise a bit for each of the at least one UE. In some aspects, the priority indication may comprise a plurality of bits. The plurality of bits may identify a transport block of a plurality of transport blocks of the at least one UE to be included in a PDSCH transmitted to the at least one UE from the at least one relay. In some aspects, the priority indication may include a field that identifies data and a corresponding UE of the at least one UE that is to be relayed by the at least one relay. The field may identify the corresponding UE based on a UE identifier. The field may identify the data based on a transport block indication. In the context of FIG. 9, the base station 904 may transmit a PDSCH 910 comprising control information and a priority indication.

At 1106, the base station may transmit, to each relay of the plurality of relays, the data priority for transmission to the at least one UE. For example, 1106 may be performed by priority component 1240 of apparatus 1202. The data priority may include a traffic priority indicating a priority for uplink and downlink transmissions. In the context of FIG. 9, the base station 904, at 912, may transmit the data priority for transmission to the relay 906. In some aspects, the traffic priority may indicate that downlink transmission has priority if a dynamic grant PDSCH is between a parent node and a relay of the plurality of relays and also between the relay and a child node. The traffic priority may be indicated in a PDCCH. In some aspects, the traffic priority may indicate that downlink transmission has priority if an SPS-PDSCH is between a parent node and a relay of the plurality of relays. The traffic priority may be indicated in a PDCCH that activates the SPS-PDSCH. In some aspects, the traffic priority may indicate that downlink transmission has priority if an SPS-PDSCH is between a relay of the plurality of relays and a child node. The traffic priority may be indicated in a PDCCH that activates the SPS-PDSCH. In some aspects, the traffic priority may indicate that uplink transmission has priority if a dynamic grant PUSCH is between a parent node and a relay of the plurality of relays and between the relay and a child node. The traffic priority may be indicated in a PDCCH. In some aspects, the traffic priority may indicate that uplink transmission has priority if a CG-PUSCH is between a parent node and a relay of the plurality of relays. The traffic priority may be indicated in a PDCCH that activates the CG-PUSCH. In some aspects, the traffic priority may indicate that uplink transmission has priority if a CG-PUSCH is between a relay of the plurality of relays and a child node. The traffic priority may be indicated in a PDCCH that activates the CG-PUSCH.

Figure 12:
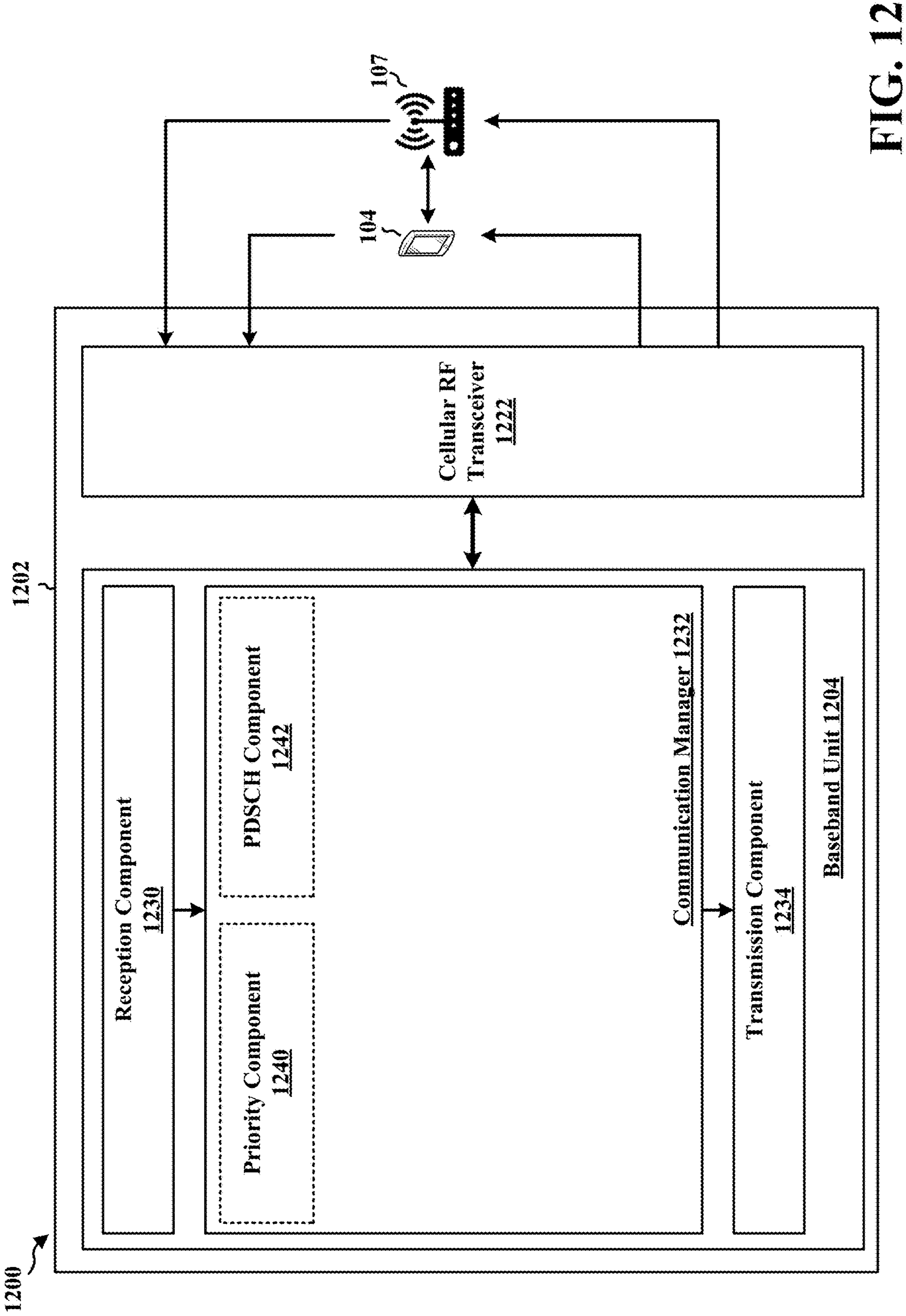
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104 and/or the relay device 107. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a priority component 1240 that may determine a priority of data priority for transmission, e.g., as described in connection with 1002 of FIG. 10 or 1102 of FIG. 11. The priority component 1240 may be configured to transmit, to each relay of the plurality of relays, the data priority for transmission to the at least one UE, e.g., as described in connection with 1106 of FIG. 11. The communication manager 1232 further includes a PDSCH component 1242 that may transmit a PDSCH comprising control information and a priority indication, e.g., as described in connection with 1004 of FIG. 10 or 1104 of FIG. 11.

The apparatus may include additional components that perform each of the blocks of the algorithm in the flowcharts of FIG. 10 or 11. As such, each block in the flowcharts of FIG. 10 or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for determining a data priority for transmission to at least one UE. The apparatus includes means for transmitting a PDSCH comprising control information for the at least one UE and a priority indication comprising the data priority for transmission to the at least one UE. Data transmitted by the at least one relay to the at least one UE is based on the priority indication. The apparatus further includes means for transmitting, to each relay of the plurality of relays, the data priority for transmission to the at least one UE. The data priority includes a traffic priority indicating a priority for uplink and downlink transmissions. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 13:
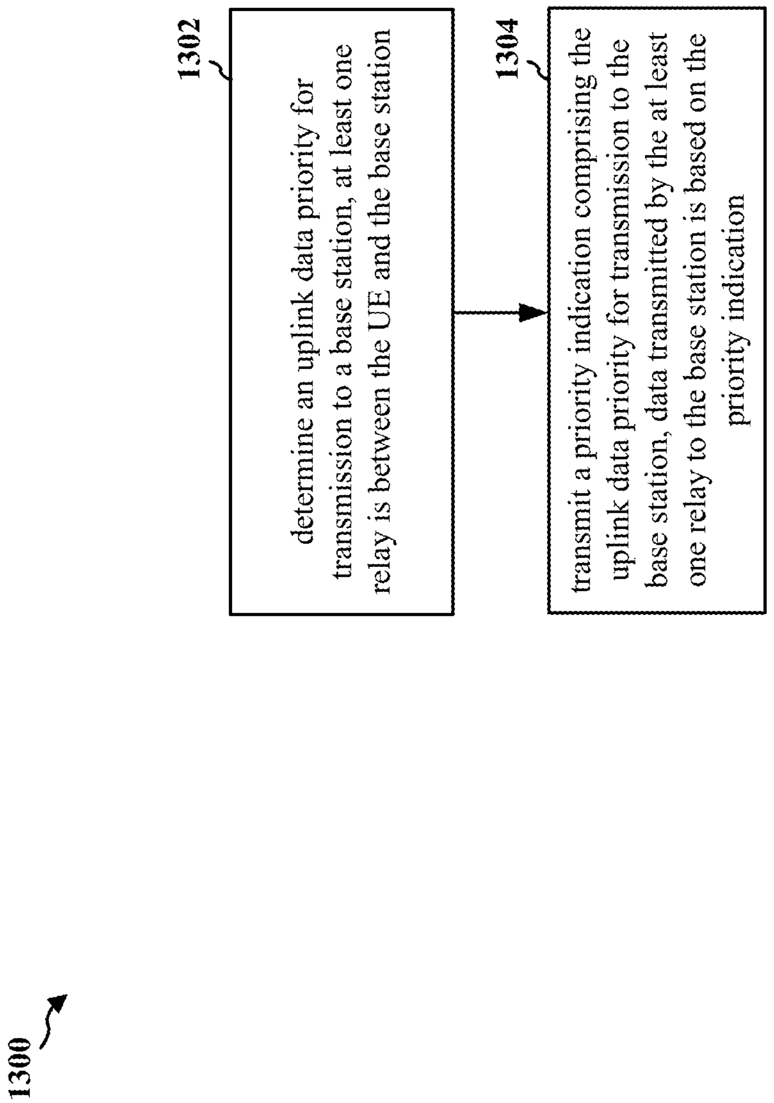
FIG. 13 is a flowchart of a method of wireless communication.

FIG. 13 is a flowchart 1300 of a method of wireless communication. The method may be performed by a UE or a component of a UE (e.g., the UE 104; the apparatus 1402; the cellular baseband processor 1404, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a UE provide a priority of uplink transmissions to each relay node of a plurality of relay nodes between the UE and a base station.

At 1302, the UE may determine an uplink data priority for transmission. For example, 1302 may be performed by priority component 1440 of apparatus 1402. The UE may determine the uplink data priority for transmission to a base station. At least one relay may be between the UE and the base station. The uplink data priority may indicate which data may be carried in a scheduled resource. In the context of FIG. 9, the UE 902, at 914, may determine an uplink data priority for transmission.

At 1304, the UE may transmit a priority indication comprising the uplink data priority for transmission to the base station. For example, 1304 may be performed by indication component 1442 of apparatus 1402. The UE may transmit the priority indication to indicate the priority of data transmissions to at least one relay between the UE and the base station. Data transmitted by the at least one relay to the base station may be based on the priority indication. In the context of FIG. 9, the UE 902, at 916, may transmit a priority indication to the relay 906. In some aspects, the priority indication may comprise a CG-UCI if there is a single UE with a single transport block. The CG-UCI may comprise a priority field to indicate the priority of the uplink data transmission. In some aspects, the priority indication may comprise a group UCI if there are multiple transport blocks per UE or multiple UEs in a PUSCH. The group UCI may comprise a priority field to indicate the priority of the uplink data transmission. In some aspects, the priority indication comprises a physical header or a MAC-CE to indicate the priority of the uplink data transmission. The uplink data transmission may comprise an aggregated PUSCH. The physical header or the MAC-CE may indicate the priority of each PUSCH in the aggregated PUSCH.

Figure 14:
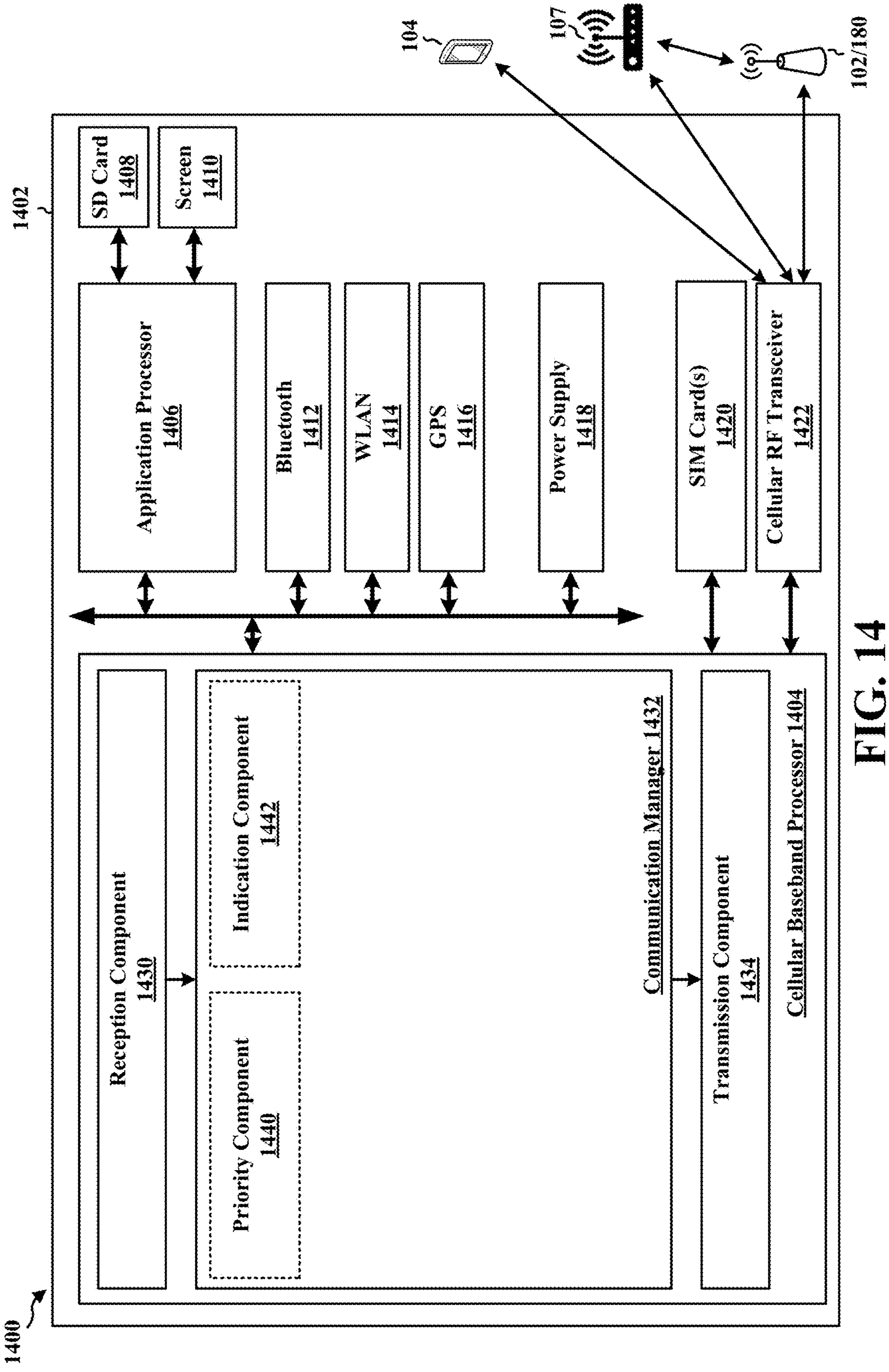
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104, the relay device 107, and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a priority component 1440 that is configured to determine a priority of uplink data transmissions, e.g., as described in connection with 1302 of FIG. 13. The communication manager 1432 further includes an indication component 1442 that is configured to transmit a priority indication to indicate the priority of uplink data transmissions, e.g., as described in connection with 1304 of FIG. 13.

The apparatus may include additional components that perform each of the blocks of the algorithm in the flowchart of FIG. 13. As such, each block in the flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for determining an uplink data priority for transmission to a base station. At least one relay is between the UE and the base station. The apparatus includes means for transmitting a priority indication comprising the uplink data priority for transmission to the base station. Data transmitted by the at least one relay to the base station is based on the priority indication. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
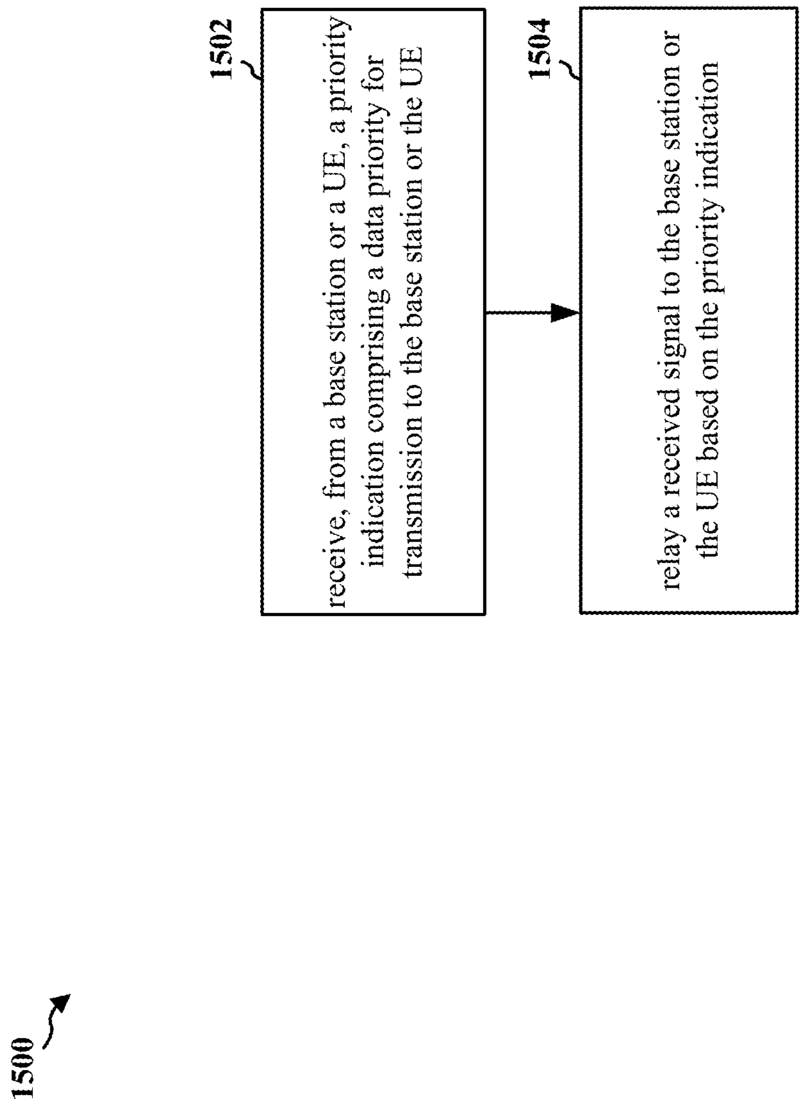
FIG. 15 is a flowchart of a method of wireless communication.

FIG. 15 is a flowchart 1500 of a method of wireless communication. The method may be performed by a relay or a component of a relay (e.g., the relay 107, 706, 708, 710, 906; the apparatus 1602; the relay processing unit 1604. One or more of the illustrated operations may be omitted, transposed, or contemporaneous. The method may allow a relay to relay received signal to a UE or a base station based on a priority indication.

At 1502, the relay may receive a priority indication. For example, 1502 may be performed by priority component 1640 of apparatus 1602. The relay may receive the priority indication from a base station or a UE. The priority indication may comprise a data priority for transmission to the base station or the UE. In some aspects, the data priority may include a traffic priority indicating a priority for uplink and downlink transmissions. In some aspects, the traffic priority may indicate that downlink transmission has priority if a dynamic grant PDSCH is between a parent node and the relay and also between the relay and a child node. The traffic priority may be indicated in a PDCCH. In some aspects, the traffic priority may indicate that downlink transmission has priority if an SPS-PDSCH is between a parent node and the relay. The traffic priority may be indicated in a PDCCH that activates the SPS-PDSCH. In some aspects, the traffic priority may indicate that downlink transmission has priority if an SPS-PDSCH is between the relay and a child node. The traffic priority may be indicated in a PDCCH that activates the SPS-PDSCH. In some aspects, the traffic priority may indicate that uplink transmission has priority if a dynamic grant PUSCH is between a parent node and the relay and between the relay and a child node. The traffic priority may be indicated in a PDCCH. In some aspects, the traffic priority may indicate that uplink transmission has priority if a CG-PUSCH is between a parent node and the relay. The traffic priority may be indicated in a PDCCH that activates the CG-PUSCH. In some aspects, the traffic priority may indicate that uplink transmission has priority if a CG-PUSCH is between the relay and a child node. The traffic priority may be indicated in a PDCCH that activates the CG-PUSCH.

At 1504, the relay may relay a received signal based on the priority indication. For example, 1504 may be performed by relay component 1642 of apparatus 1602. The relay may relay the received signal to the base station or the UE based on the priority indication. In some aspects, the priority indication may indicate data corresponding to the UE to be included in the relay of the received signal from the relay to UE. The priority indication may comprise a plurality of bits. The plurality of bits may identify a transport block of a plurality of transport blocks of the UE to be included in a PDSCH transmitted to the UE from the relay.

Figure 16:
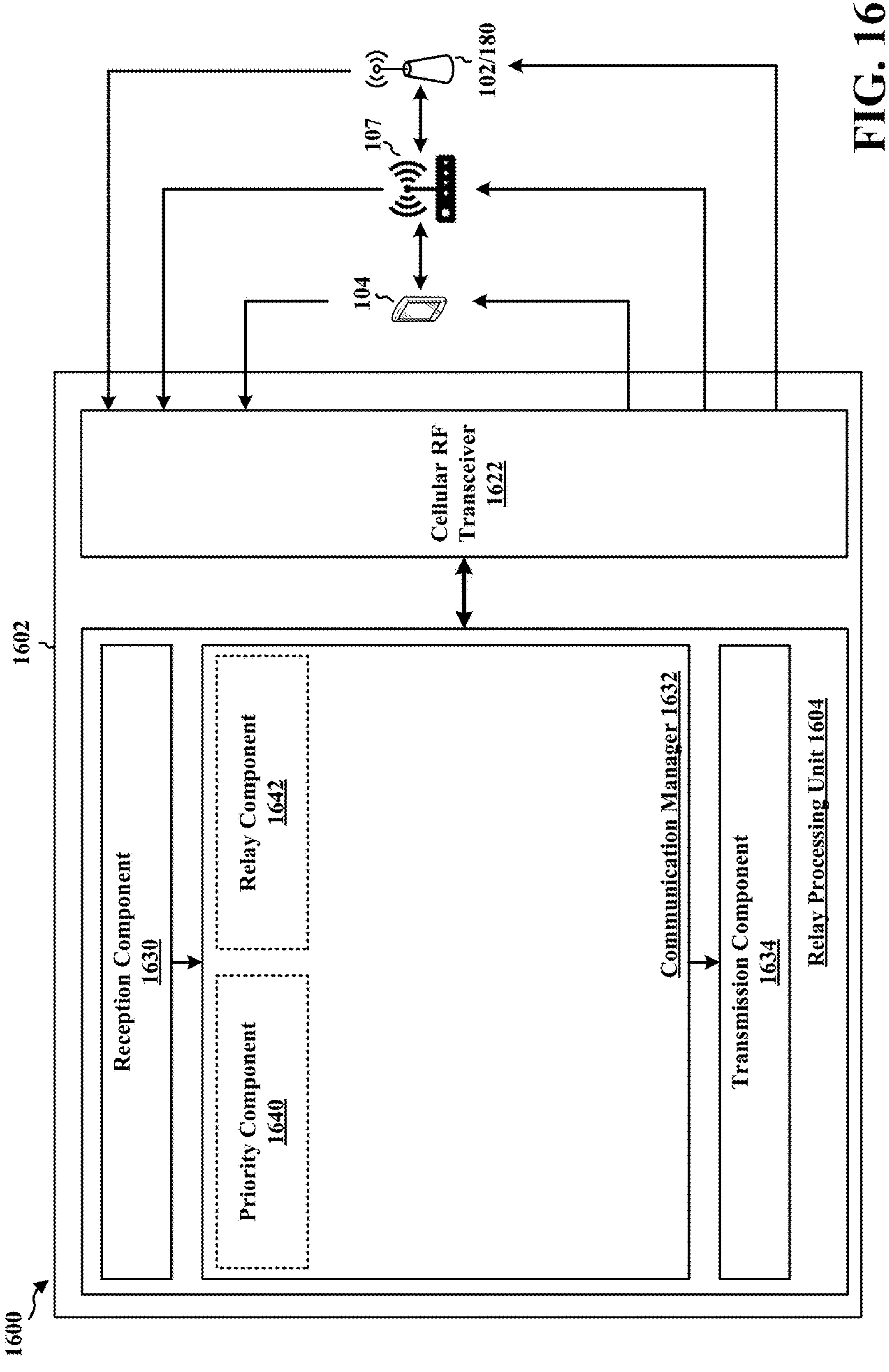
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a priority component 1640 that may receive a priority indication, e.g., as described in connection with 1502 of FIG. 15. The communication manager 1632 further includes a relay component 1642 that may relay a received signal based on the priority indication, e.g., as described in connection with 1504 of FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving, from a base station or a UE, a priority indication comprising a data priority for transmission to the base station or the UE. The apparatus includes means for relaying a received signal to the base station or the UE based on the priority indication. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and a transceiver configured to determine a data priority transmission to at least one UE, wherein at least one relay is between the base station and the at least one UE; and transmit a PDSCH comprising control information for the at least one UE and a priority indication comprising the data priority for transmission to the at least one UE, wherein data transmitted by the at least one relay to the at least one UE is based on the priority indication.

Aspect 2 is the apparatus of aspect 1, further includes that the priority indication indicates the data corresponding to the at least one UE to be included in the transmission from the at least one relay to the at least one UE.

Aspect 3 is the apparatus of any of aspects 1 and 2, further includes that the priority indication comprises a bit for each of the at least one UE.

Aspect 4 is the apparatus of any of aspects 1-3, further includes that the priority indication comprises a plurality of bits, wherein the plurality of bits identify a transport block of a plurality of transport blocks of the at least one UE to be included in a PDSCH transmitted to the at least one UE from the at least one relay.

Aspect 5 is the apparatus of any of aspects 1-4, further includes that the priority indication includes a field that identifies data and a corresponding UE of the at least one UE that is to be relayed by the at least one relay.

Aspect 6 is the apparatus of any of aspects 1-5, further includes that the field identifies the corresponding UE based on a UE identifier.

Aspect 7 is the apparatus of any of aspects 1-6, further includes that the field identifies the data based on a transport block indication.

Aspect 8 is the apparatus of any of aspects 1-7, further includes that the at least one processor is further configured to transmit, to each relay of the plurality of relays, the data priority for transmission to the at least one UE, wherein the data priority includes a traffic priority indicating a priority for uplink and downlink transmissions.

Aspect 9 is the apparatus of any of aspects 1-8, further includes that the traffic priority indicates that downlink transmission has priority if a dynamic grant PDSCH is between a parent node and a relay of the plurality of relays and also between the relay and a child node, wherein the traffic priority is indicated in a PDCCH.

Aspect 10 is the apparatus of any of aspects 1-9, further includes that the traffic priority indicates that downlink transmission has priority if a semi-persistent scheduling (SPS) PDSCH (SPS-PDSCH) is between a parent node and a relay of the plurality of relays, wherein the traffic priority is indicated in a PDCCH that activates the SPS-PDSCH.

Aspect 11 is the apparatus of any of aspects 1-10, further includes that the traffic priority indicates that downlink transmission has priority if a semi-persistent scheduling (SPS) PDSCH (SPS-PDSCH) is between a relay of the plurality of relays and a child node, wherein the traffic priority is indicated in a PDCCH that activates the SPS-PDSCH.

Aspect 12 is the apparatus of any of aspects 1-11, further includes that the traffic priority indicates that uplink transmission has priority if a dynamic grant PUSCH is between a parent node and a relay of the plurality of relays and between the relay and a child node, wherein the traffic priority is indicated in a PDCCH.

Aspect 13 is the apparatus of any of aspects 1-12, further includes that the traffic priority indicates that uplink transmission has priority if a CG-PUSCH is between a parent node and a relay of the plurality of relays, wherein the traffic priority is indicated in a PDCCH that activates the CG-PUSCH.

Aspect 14 is the apparatus of any of aspects 1-13, further includes that the traffic priority indicates that uplink transmission has priority if a CG-PUSCH is between a relay of the plurality of relays and a child node, wherein the traffic priority is indicated in a PDCCH that activates the CG-PUSCH.

Aspect 15 is a method of wireless communication for implementing any of aspects 1-14.

Aspect 16 is an apparatus for wireless communication including means for implementing any of aspects 1-14.

Aspect 17 is a computer-readable medium storing computer executable code, where the code when executed by a processor causes the processor to implement any of aspects 1-14.

Aspect 18 is an apparatus for wireless communication at a UE including at least one processor coupled to a memory and a transceiver configured to determine an uplink data priority for transmission to a base station, wherein at least one relay is between the UE and the base station; and transmit a priority indication comprising the uplink data priority for transmission to the base station, wherein data transmitted by the at least one relay to the base station is based on the priority indication.

Aspect 19 is the apparatus of aspect 18, further includes that the priority indication comprises a CG-UCI if there is a single UE with a single transport block.

Aspect 20 is the apparatus of any of aspects 18 and 19, further includes that the CG-UCI comprises a priority field to indicate the priority of the uplink data transmission.

Aspect 21 is the apparatus of any of aspects 18-20, further includes that the priority indication comprises a group UCI if there are multiple transport blocks per UE or multiple UEs in a PUSCH.

Aspect 22 is the apparatus of any of aspects 18-21, further includes that the group UCI comprises a priority field to indicate the priority of the uplink data transmission.

Aspect 23 is the apparatus of any of aspects 18-22, further includes that the priority indication comprises a physical header or a MAC-CE to indicate the priority of the uplink data transmission.

Aspect 24 is the apparatus of any of aspects 18-23, further includes that the uplink data transmission comprises an aggregated PUSCH, wherein the physical header or the MAC-CE indicate the priority of each PUSCH in the aggregated PUSCH.

Aspect 25 is a method of wireless communication for implementing any of aspects 18-24.

Aspect 26 is an apparatus for wireless communication including means for implementing any of aspects 18-24.

Aspect 27 is a computer-readable medium storing computer executable code, where the code when executed by a processor causes the processor to implement any of aspects 18-24.

Aspect 28 is an apparatus for wireless communication at a relay including at least one processor coupled to a memory and a transceiver configured to receive, from a base station or a UE, a priority indication comprising a data priority for transmission to the base station or the UE; and relay a received signal to the base station or the UE based on the priority indication.

Aspect 29 is the apparatus of aspect 28, further includes that the priority indication indicates data corresponding to the UE to be included in the relay of the received signal from the relay to UE.

Aspect 30 is the apparatus of any of aspects 28 and 29, further includes that the priority indication comprises a plurality of bits, wherein the plurality of bits identifies a transport block of a plurality of transport blocks of the UE to be included in a PDSCH transmitted to the UE from the relay.

Aspect 31 is the apparatus of any of aspects 28-30, further includes that the data priority includes a traffic priority indicating a priority for uplink and downlink transmissions.

Aspect 32 is the apparatus of any of aspects 28-31, further includes that the traffic priority indicates that downlink transmission has priority if a dynamic grant PDSCH is between a parent node and the relay and also between the relay and a child node, wherein the traffic priority is indicated in a PDCCH.

Aspect 33 is the apparatus of any of aspects 28-32, further includes that the traffic priority indicates that downlink transmission has priority if an SPS-PDSCH is between a parent node and the relay, wherein the traffic priority is indicated in a PDCCH that activates the SPS-PDSCH.

Aspect 34 is the apparatus of any of aspects 28-33, further includes that the traffic priority indicates that downlink transmission has priority if an SPS-PDSCH is between the relay and a child node, wherein the traffic priority is indicated in a PDCCH that activates the SPS-PDSCH.

Aspect 35 is the apparatus of any of aspects 28-34, further includes that the traffic priority indicates that uplink transmission has priority if a dynamic grant physical uplink shared channel (PUSCH) is between a parent node and the relay and between the relay and a child node, wherein the traffic priority is indicated in a PDCCH.

Aspect 36 is the apparatus of any of aspects 28-35, further includes that the traffic priority indicates that uplink transmission has priority if a configured grant physical uplink shared channel (CG-PUSCH) is between a parent node and the relay, wherein the traffic priority is indicated in a PDCCH that activates the CG-PUSCH.

Aspect 37 is the apparatus of any of aspects 28-36, further includes that the traffic priority indicates that uplink transmission has priority if a configured grant physical uplink shared channel (CG-PUSCH) is between the relay and a child node, wherein the traffic priority is indicated in a PDCCH that activates the CG-PUSCH.

Aspect 38 is a method of wireless communication for implementing any of aspects 28-37.

Aspect 39 is an apparatus for wireless communication including means for implementing any of aspects 28-37.

Aspect 40 is a computer-readable medium storing computer executable code, where the code when executed by a processor causes the processor to implement any of aspects 28-37.

What is claimed is:

1. An apparatus for wireless communication at a base station, comprising:

a memory;

a transceiver; and at least one processor coupled to the memory and the transceiver, the at least one processor configured to:

determine a data priority for transmission to at least one user equipment (UE), wherein at least one relay is between the base station and the at least one UE, wherein the data priority indicates a priority associated with the data to be carried in a scheduled resource; and transmit a physical downlink shared channel (PDSCH) comprising control information for the at least one UE and a priority indication comprising the data priority for transmission to the at least one UE, wherein data transmitted by the at least one relay to the at least one UE is based on the priority indication.

2. The apparatus of claim 1, wherein the priority indication indicates the data corresponding to the at least one UE to be included in the transmission from the at least one relay to the at least one UE.

3. The apparatus of claim 2, wherein the priority indication comprises a bit for each of the at least one UE.

4. The apparatus of claim 2, wherein the priority indication comprises a plurality of bits, wherein the plurality of bits identify a transport block of a plurality of transport blocks of the at least one UE to be included in a PDSCH transmitted to the at least one UE from the at least one relay.

5. The apparatus of claim 1, wherein the priority indication includes a field that identifies data and a corresponding UE of the at least one UE that is to be relayed by the at least one relay.

6. The apparatus of claim 5, wherein the field identifies the corresponding UE based on a UE identifier, wherein the field identifies the data based on a transport block indication.

7. The apparatus of claim 1, wherein the at least one processor is further configured to:

transmit, to each relay of a plurality of relays, the data priority for transmission to the at least one UE, wherein the data priority includes a traffic priority indicating a priority for uplink and downlink transmissions.

8. The apparatus of claim 7, wherein the traffic priority indicates that downlink transmission has priority if a dynamic grant PDSCH is between a parent node and a relay of the plurality of relays and also between the relay and a child node, wherein the traffic priority is indicated in a PDCCH.

9. The apparatus of claim 7, wherein the traffic priority indicates that downlink transmission has priority if a semi-persistent scheduling (SPS) PDSCH (SPS-PDSCH) is between a parent node and a relay of the plurality of relays, wherein the traffic priority is indicated in a PDCCH that activates the SPS-PDSCH.

10. The apparatus of claim 7, wherein the traffic priority indicates that downlink transmission has priority if a semi-persistent scheduling (SPS) PDSCH (SPS-PDSCH) is between a relay of the plurality of relays and a child node, wherein the traffic priority is indicated in a PDCCH that activates the SPS-PDSCH.

11. The apparatus of claim 7, wherein the traffic priority indicates that uplink transmission has priority if a dynamic grant physical uplink shared channel (PUSCH) is between a parent node and a relay of the plurality of relays and between the relay and a child node, wherein the traffic priority is indicated in a PDCCH.

12. The apparatus of claim 7, wherein the traffic priority indicates that uplink transmission has priority if a configured grant physical uplink shared channel (CG-PUSCH) is between a parent node and a relay of the plurality of relays, wherein the traffic priority is indicated in a PDCCH that activates the CG-PUSCH.

13. The apparatus of claim 7, wherein the traffic priority indicates that uplink transmission has priority if a configured grant physical uplink shared channel (CG-PUSCH) is between a relay of the plurality of relays and a child node, wherein the traffic priority is indicated in a PDCCH that activates the CG-PUSCH.

14. An apparatus for wireless communication at a base station comprising:

a memory;

a transceiver; and at least one processor coupled to the memory and the transceiver, the at least one processor configured to:

determine a priority of data transmission at each relay of a plurality of relays between the base station and at least one user equipment (UE), wherein the priority of data transmission indicates a priority associated with the data to be carried in a scheduled resource; and transmit a physical downlink shared channel (PDSCH) comprising control information for the at least one UE and a priority indication instructing each relay of the plurality of relays which data is contained in the PDSCH.

15. The apparatus of claim 14, wherein the PDSCH includes an indication indicating whether data corresponding to the at least one UE is contained in the PDSCH.

16. The apparatus of claim 14, wherein the PDSCH includes a field that identifies data and a corresponding UE of the at least one UE that is contained in the PDSCH.

17. The apparatus of claim 14, wherein the at least one processor is configured to:

transmit, to each relay of the plurality of relays, the priority of data transmission, wherein the priority of data transmission includes a priority for uplink and downlink transmissions.

18. An apparatus for wireless communication at a user equipment (UE), comprising:

a memory;

a transceiver; and at least one processor coupled to the memory and the transceiver, the at least one processor configured to:

determine an uplink data priority for transmission to a base station, wherein at least one relay is between the UE and the base station, wherein the uplink data priority indicates a priority associated with the uplink data to be carried in a scheduled resource; and transmit a priority indication comprising the uplink data priority for transmission to the base station, wherein data transmitted by the at least one relay to the base station is based on the priority indication.

19. The apparatus of claim 18, wherein the priority indication comprises a configured grant uplink control information (CG-UCI) if there is a single UE with a single transport block, wherein the CG-UCI comprises a priority field to indicate the priority of the uplink data transmission.

20. The apparatus of claim 18, wherein the priority indication comprises a group uplink control information (UCI) if there are multiple transport blocks per UE or multiple UEs in a physical uplink shared channel (PUSCH), wherein the group UCI comprises a priority field to indicate the priority of the uplink data transmission.

21. The apparatus of claim 18, wherein the priority indication comprises a physical header or a medium access control (MAC) control element (CE) (MAC-CE) to indicate the priority of the uplink data transmission, wherein the uplink data transmission comprises an aggregated physical uplink shared channel (PUSCH), wherein the physical header or the MAC-CE indicate the priority of each PUSCH in the aggregated PUSCH.

22. An apparatus for wireless communication at a relay device, comprising:

a memory;

a transceiver; and at least one processor coupled to the memory and the transceiver, the at least one processor configured to:

receive, from a base station or a user equipment (UE), a priority indication comprising a data priority for transmission to the base station or the UE, wherein the data priority indicates a priority associated with the data to be carried in a scheduled resource; and relay a received signal to the base station or the UE based on the priority indication.

23. The apparatus of claim 22, wherein the priority indication indicates data corresponding to the UE to be included in the relay of the received signal from the relay to UE, wherein the priority indication comprises a plurality of bits, wherein the plurality of bits identifies a transport block of a plurality of transport blocks of the UE to be included in a PDSCH transmitted to the UE from the relay.

24. The apparatus of claim 22, wherein the data priority includes a traffic priority indicating a priority for uplink and downlink transmissions.

25. The apparatus of claim 24, wherein the traffic priority indicates that downlink transmission has priority if a dynamic grant PDSCH is between a parent node and the relay and also between the relay and a child node, wherein the traffic priority is indicated in a PDCCH.

26. The apparatus of claim 24, wherein the traffic priority indicates that downlink transmission has priority if a semi-persistent scheduling (SPS) PDSCH (SPS-PDSCH) is between a parent node and the relay, wherein the traffic priority is indicated in a PDCCH that activates the SPS-PDSCH.

27. The apparatus of claim 24, wherein the traffic priority indicates that downlink transmission has priority if a semi-persistent scheduling (SPS) PDSCH (SPS-PDSCH) is between the relay and a child node, wherein the traffic priority is indicated in a PDCCH that activates the SPS-PDSCH.

28. The apparatus of claim 24, wherein the traffic priority indicates that uplink transmission has priority if a dynamic grant physical uplink shared channel (PUSCH) is between a parent node and the relay and between the relay and a child node, wherein the traffic priority is indicated in a PDCCH.

29. The apparatus of claim 24, wherein the traffic priority indicates that uplink transmission has priority if a configured grant physical uplink shared channel (CG-PUSCH) is between a parent node and the relay, wherein the traffic priority is indicated in a PDCCH that activates the CG-PUSCH.

30. The apparatus of claim 24, wherein the traffic priority indicates that uplink transmission has priority if a configured grant physical uplink shared channel (CG-PUSCH) is between the relay and a child node, wherein the traffic priority is indicated in a PDCCH that activates the CG-PUSCH.

* * * * *